(12) United States Patent
Barker et al.

(10) Patent No.: US 10,830,058 B2
(45) Date of Patent: Nov. 10, 2020

(54) TURBINE ENGINE COMPONENTS WITH COOLING FEATURES

(71) Applicant: Rolls-Royce Corporation, Indianapolis, IN (US)

(72) Inventors: Brett J. Barker, Indianapolis, IN (US); Bruce E. Varney, Greenwood, IN (US); Paul H. Davis, Indianapolis, IN (US); Kevin P. Holley, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 240 days.

(21) Appl. No.: 15/796,125

(22) Filed: Oct. 27, 2017

(65) Prior Publication Data

US 2018/0149023 A1    May 31, 2018

Related U.S. Application Data

(60) Provisional application No. 62/428,315, filed on Nov. 30, 2016.

(51) Int. Cl.
*F01D 5/18*    (2006.01)

(52) U.S. Cl.
CPC ............. *F01D 5/187* (2013.01); *F01D 5/186* (2013.01); *F05D 2220/32* (2013.01); *F05D 2230/31* (2013.01); *F05D 2240/301* (2013.01); *F05D 2250/184* (2013.01); *F05D 2250/25* (2013.01); *F05D 2260/201* (2013.01); *F05D 2260/202* (2013.01); *F05D 2260/204* (2013.01); *Y02T 50/676* (2013.01)

(58) Field of Classification Search
CPC ......... F01D 5/18–189; F02D 2240/301; F02D 2260/20–22141; F05D 2240/81
USPC ..................................... 415/115; 416/95–96 A
See application file for complete search history.

(56) References Cited

U.S. PATENT DOCUMENTS

| | | | |
|---|---|---|---|
| 3,191,908 A | | 6/1965 | Bowen et al. |
| 3,806,276 A | * | 4/1974 | Aspinwall ............... F01D 5/189 |
| | | | 416/97 R |
| 3,819,295 A | * | 6/1974 | Hauser .................... B23P 15/04 |
| | | | 416/97 R |
| 4,080,095 A | * | 3/1978 | Stahl ....................... F01D 5/187 |
| | | | 415/178 |
| 5,062,768 A | | 11/1991 | Marriage et al. |
| 5,370,499 A | * | 12/1994 | Lee ......................... F01D 5/186 |
| | | | 416/97 A |

(Continued)

FOREIGN PATENT DOCUMENTS

| | | |
|---|---|---|
| EP | 1091092 A2 | 4/2001 |
| EP | 1518619 A1 | 3/2005 |

(Continued)

*Primary Examiner* — Erick R Solis
*Assistant Examiner* — Robert A Werner
(74) *Attorney, Agent, or Firm* — Barnes & Thornburg LLP

(57) ABSTRACT

An airfoil for use in a gas turbine engine is disclosed herein. The airfoil includes a pressure side wall, a suction side wall, and a cooling air distribution system. The suction side wall is arranged opposite the pressure side wall. The cooling air distribution system is formed internal to at least one of the pressure side wall and the suction side wall. The cooling air distribution system is configured to distribute cooling air through the airfoil to cool the airfoil.

20 Claims, 11 Drawing Sheets

(56) References Cited

U.S. PATENT DOCUMENTS

| | | | |
|---|---|---|---|
| 5,681,144 A | 10/1997 | Spring et al. | |
| 5,690,472 A | 11/1997 | Lee et al. | |
| 5,690,473 A | 11/1997 | Kercher et al. | |
| 5,813,836 A | 9/1998 | Starkweather | |
| 6,077,034 A | 6/2000 | Tomita et al. | |
| 6,382,907 B1 * | 5/2002 | Bregman | F01D 5/187 |
| | | | 415/115 |
| 6,874,987 B2 | 4/2005 | Slinger et al. | |
| 6,984,102 B2 | 1/2006 | Bunker et al. | |
| 7,186,084 B2 | 3/2007 | Bunker et al. | |
| 7,544,044 B1 | 6/2009 | Liang | |
| 7,563,072 B1 * | 7/2009 | Liang | F01D 5/187 |
| | | | 415/115 |
| 7,572,103 B2 | 8/2009 | Walters et al. | |
| 7,753,650 B1 * | 7/2010 | Liang | F01D 5/187 |
| | | | 416/97 R |
| 8,317,474 B1 * | 11/2012 | Liang | F01D 5/186 |
| | | | 415/115 |
| 8,408,866 B2 | 4/2013 | Weaver et al. | |
| 9,562,437 B2 | 2/2017 | Kollati et al. | |
| 9,638,057 B2 | 5/2017 | Kwon | |
| 10,145,246 B2 * | 12/2018 | Lewis | F01D 5/187 |
| 2005/0232769 A1 | 10/2005 | Lee et al. | |
| 2005/0281675 A1 | 12/2005 | Liang | |
| 2006/0222492 A1 | 10/2006 | Gross | |
| 2009/0274549 A1 | 11/2009 | Mitchell et al. | |
| 2014/0328669 A1 * | 11/2014 | Bregman | F01D 5/187 |
| | | | 415/115 |
| 2015/0218951 A1 * | 8/2015 | Weaver | F01D 5/187 |
| | | | 416/1 |
| 2018/0038233 A1 * | 2/2018 | Lee | F01D 5/187 |

FOREIGN PATENT DOCUMENTS

| | | |
|---|---|---|
| EP | 1992784 A2 | 11/2008 |
| EP | 3135406 A1 | 3/2017 |
| EP | 3179039 A1 | 6/2017 |
| GB | 2310896 A | 9/1997 |
| GB | 2391046 A | 1/2004 |
| JP | 2005299638 A | 10/2005 |

* cited by examiner

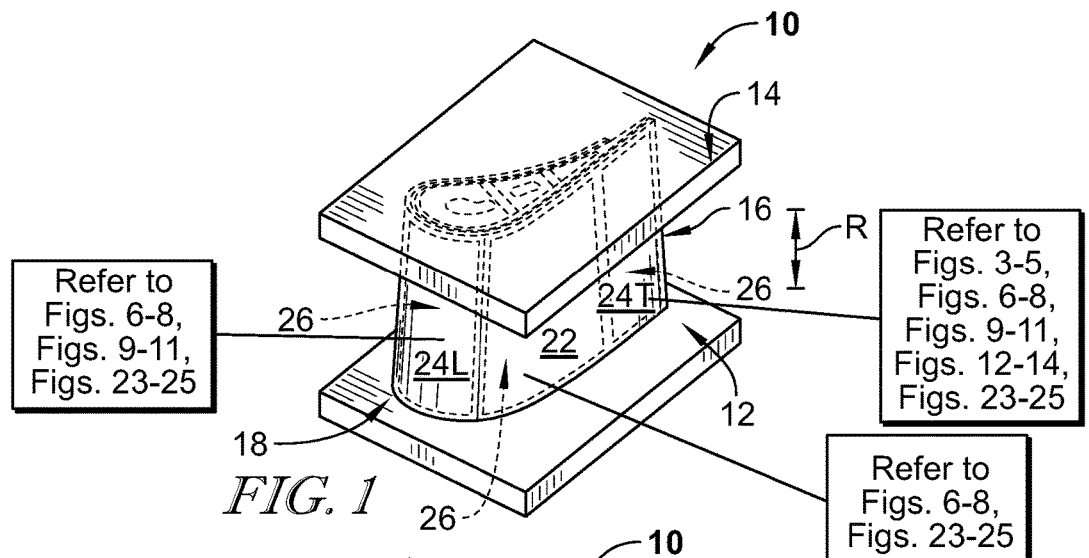
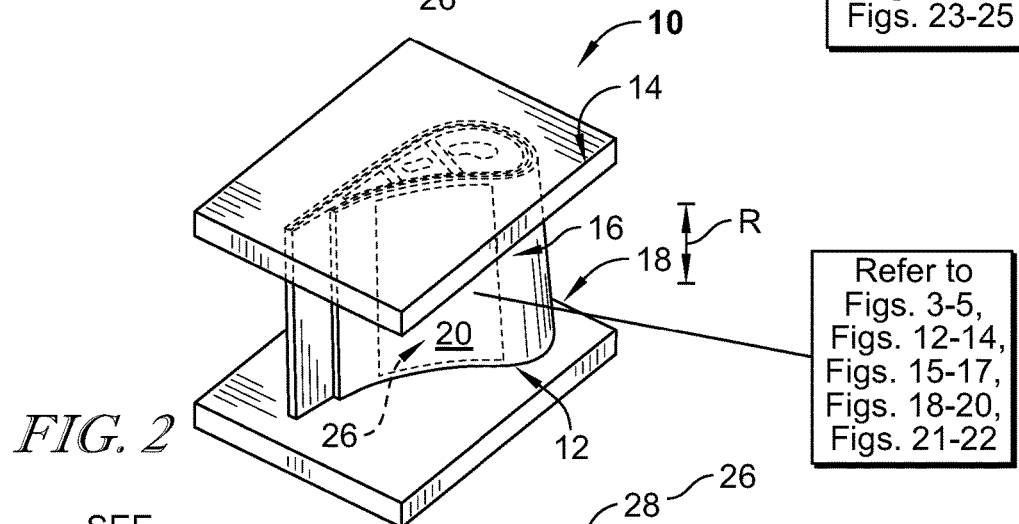
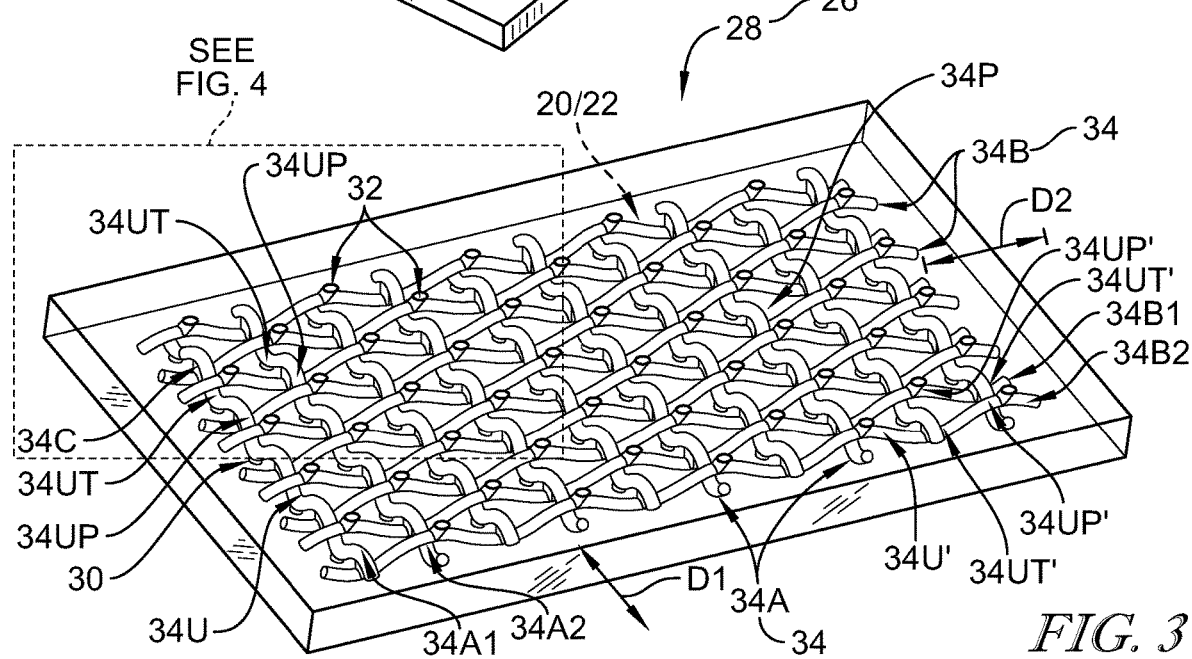

TURBINE ENGINE COMPONENTS WITH COOLING FEATURES

CROSS REFERENCE TO RELATED APPLICATIONS

This application claims priority to and the benefit of U.S. Provisional Patent Application No. 62/428,315, filed 30 Nov. 2016, the disclosure of which is now expressly incorporated herein by reference.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that may require the airfoils to be actively cooled by supplying relatively cool air to the vanes and blades. Relatively cool air may sometimes be passed through the airfoils of the vanes and blades to allow those components to withstand the high temperatures of the combustion products. Cooling airfoils of the vanes and blades to withstand those temperatures remains an area of interest.

SUMMARY

The present disclosure may comprise one or more of the following features and combinations thereof.

According to one aspect of the present disclosure, an airfoil may include a pressure side wall, a suction side wall, and a cooling air distribution system. The suction side wall may be arranged opposite the pressure side wall. The cooling air distribution system may be formed internal to at least one of the pressure side wall and the suction side wall. The cooling air distribution system may be configured to distribute cooling air through the airfoil to cool the airfoil. The cooling air distribution system may have a plurality of feed ports, a plurality of discharge ports, and a plurality of cooling passages. The plurality of feed ports may be configured to receive cooling air from a source of cooling air. The plurality of discharge ports may be fluidly coupled to the plurality of feed ports and configured to discharge cooling air provided to the plurality of feed ports. The plurality of discharge ports may be located exteriorly of the plurality of feed ports. The plurality of cooling passages may interconnect the plurality of feed ports and the plurality of discharge ports. The plurality of cooling passages may be configured to conduct cooling air from the plurality of feed ports to the plurality of discharge ports so that at least some of the cooling air provided to the plurality of feed ports is discharged by the plurality of discharge ports. The plurality of cooling passages may have a first set of passages having a circular cross-section and a second set of passages having a circular cross-section interwoven with the first set of passages and arranged to extend perpendicular to the first set of passages. The first set of passages may each having a generally sinusoidal shape or a generally corkscrew-type shape and the second set of passages may each having a generally sinusoidal shape or a generally corkscrew-type shape.

In some embodiments, each of the first set of passages may have a generally sinusoidal shape and include a plurality of peaks interconnected with a plurality of troughs, and each of the second set of passages may have a generally sinusoidal shape and include a plurality of peaks interconnected with a plurality of troughs. The plurality of feed ports may be arranged to provide cooling air directly to the troughs of each of the first set of passages, and the plurality of discharge ports may be arranged to discharge cooling air directly from the peaks of each of the second set of passages.

In some embodiments, each of the first set of passages may have a generally corkscrew-type shape and each of the second set of passages may have a generally sinusoidal shape and include a plurality of peaks interconnected with a plurality of troughs. The plurality of feed ports may be arranged to provide cooling air directly to each of the first set of passages, and the plurality of discharge ports may be arranged to discharge cooling air directly from the peaks of each of the second set of passages.

In some embodiments, each of the first set of passages may have a generally corkscrew-type shape and each of the second set of passages may have a generally corkscrew-type shape. Each of the first set of passages may extend around a first longitudinal axis in one direction and each of the second set of passages may extend around a second longitudinal axis perpendicular to the first longitudinal axis in the one direction. Additionally, in some embodiments, each of the first set of passages may extend around a first longitudinal axis in one direction and each of the second set of passages may extend around a second longitudinal axis perpendicular to the first longitudinal axis in another direction opposite the one direction.

According to another aspect of the present disclosure, an airfoil may include a pressure side wall, a suction side wall, and a cooling air distribution system. The suction side wall may be arranged opposite the pressure side wall. The cooling air distribution system may be formed internal to at least one of the pressure side wall and the suction side wall. The cooling air distribution system may be configured to distribute cooling air through the airfoil to cool the airfoil. The cooling air distribution may have a first set of cooling passages and a second set of cooling passages interwoven with the first set of cooling passages. The first set of cooling passages may each have one of a generally sinusoidal shape or a generally corkscrew-type shape, and the second set of cooling passages may each have a generally sinusoidal shape or a generally corkscrew-type shape. The first and second sets of cooling passages may intersect one another such that cooling air provided to each of the first set of cooling passages may be conducted through one of the second set of cooling passages before being discharged toward at least one of the pressure side wall and the suction side wall during operation of the airfoil.

In some embodiments, the first and second sets of cooling passages may be arranged to extend perpendicular to one another, the first set of cooling passages may each have a generally sinusoidal shape and include a plurality of peaks interconnected with a plurality of troughs and a plurality of cross-feed portions interconnected with and extending interiorly away from the plurality of peaks, the second set of cooling passages may each have a generally sinusoidal shape and include a plurality of peaks interconnected with a plurality of troughs, and the plurality of cross-feed portions of the first set of cooling passages may intersect the troughs of the second set of cooling passages. Additionally, in some embodiments, the first set of cooling passages may each have a generally corkscrew-type shape, the second set of passages may each have a generally corkscrew-type shape and each cooperate with one of the first set of cooling passages to define a helix shape, each one of the first set of cooling passages may extend around a longitudinal axis in a first direction, and one of the second set of cooling passages may extend around the longitudinal axis in the first direction.

In some embodiments, the first set of cooling passages may each have a generally corkscrew-type shape, the second set of passages may each have a generally corkscrew-type shape and each cooperate with one of the first set of cooling passages to define a helix shape, each one of the first set of cooling passages may extend around a longitudinal axis in a first direction, and one of the second set of cooling passages may extend around the longitudinal axis in a second direction opposite the first direction. The first and second sets of cooling passages may intersect one another at first intersection locations and second intersection locations spaced apart from one another, the first intersection locations may be located interiorly of the second intersection locations, the first intersection locations may be fluidly coupled to a plurality of feed ports configured to provide cooling air directly to the first intersection locations, and the second intersection locations may be fluidly coupled to a plurality of discharge ports configured to discharge cooling air provided by the plurality of feed ports directly from the second intersection locations.

In some embodiments, the first and second sets of cooling passages may be arranged to extend perpendicular to one another, the first set of cooling passages may each have a generally corkscrew-type shape and include a plurality of cross-feed portions interconnected with and extending interiorly away from at least one coil portion of each of the first set of cooling passages, the second set of cooling passages may each have a generally sinusoidal shape and include a plurality of peaks interconnected with a plurality of troughs, and the plurality of cross-feed portions of the first set of cooling passages may intersect the troughs of the second set of cooling passages. Additionally, in some embodiments, the first and second sets of cooling passages may be arranged to extend perpendicular to one another, the first set of cooling passages may each have a generally corkscrew-type shape, the second set of passages may each have a generally corkscrew-type shape, each one of the first set of cooling passages may extend around a first longitudinal axis in a first direction, and each one of the second set of cooling passages may extend around a second longitudinal axis perpendicular to the first longitudinal axis in a second direction opposite the first direction. Additionally, in some embodiments still, the first and second sets of cooling passages may be arranged to extend perpendicular to one another, the first set of cooling passages may each have a generally corkscrew-type shape, the second set of passages may each have a generally corkscrew-type shape, each one of the first set of cooling passages may extend around a first longitudinal axis in a first direction, and each one of the second set of cooling passages may extend around a second longitudinal axis perpendicular to the first longitudinal axis in the first direction.

According to yet another aspect of the present disclosure, an airfoil may include a pressure side wall, a suction side wall, and a cooling air distribution system. The suction side wall may be arranged opposite the pressure side wall. The cooling air distribution system may be formed internal to at least one of the pressure side wall and the suction side wall. The cooling air distribution system may be configured to distribute cooling air through the airfoil to cool the airfoil. The cooling air distribution system may have a plurality of feed ports, a plurality of discharge ports, and at least one array of cooling passages. The plurality of feed ports may be configured to receive cooling air from a source of cooling air. The plurality of discharge ports may be fluidly coupled to the plurality of feed ports and configured to discharge cooling air provided to the plurality of feed ports. The plurality of discharge ports may be located exteriorly of the plurality of feed ports. The at least one array of cooling passages may interconnect the plurality of feed ports and the plurality of discharge ports. At least one of the cooling passages may extend exteriorly and interiorly of a central axis. The at least one of the cooling passages may include first portions having surface roughness steps formed at angles to the central axis to provide relatively rough surfaces of the at least one of the cooling passages and second portions coupled to the first portions that do not include surface roughness steps and provide relatively smooth surfaces of the at least one of the cooling passages.

In some embodiments, each of the surface roughness steps may be formed at an angle of about 45 degrees relative to the central axis. The at least one array of cooling passages may include a first array of cooling passages arranged to extend along the pressure side wall and a second array of cooling passages arranged to extend along the suction side wall, and the first and second arrays of cooling passages may be different from one another and configured to provide different amounts of cooling along the pressure and suction side walls of the airfoil during operation of the airfoil. The pressure side wall and the suction side wall may cooperate to define a leading edge of the airfoil and a trailing edge of the airfoil arranged opposite the leading edge, the at least one array of cooling passages may include a third array of cooling passages arranged to extend along the leading edge of the airfoil and a fourth array of cooling passages arranged to extend along the trailing edge of the airfoil, and the third and fourth arrays of cooling passages may be different from one another and configured to provide different amounts of cooling along the leading and trailing edges of the airfoil during operation of the airfoil.

These and other features of the present disclosure will become more apparent from the following description of the illustrative embodiments.

BRIEF DESCRIPTION OF THE DRAWINGS

FIG. 1 is a perspective view of a vane of a gas turbine engine showing that the vane includes an airfoil having a leading edge, a trailing edge, a pressure side wall, a suction side wall, and an internally formed cooling air distribution system that includes one or more different cooling air subsystems arranged along various surfaces of the airfoil;

FIG. 2 is another perspective view of the vane of FIG. 1 showing that the cooling air distribution system includes one or more different cooling air subsystems arranged along the pressure side wall;

FIG. 3 is a perspective view of a first cooling air subsystem that may be included in the cooling air distribution system shown in FIG. 1 showing that the first cooling air subsystem includes one set of cooling passages having a generally sinusoidal shape and a circular cross-sectional shape and another set of cooling passages having a generally sinusoidal shape and a circular cross-sectional shape interwoven with, and arranged perpendicular to, the one set of cooling passages to form a mesh cooling pattern;

DETAILED DESCRIPTION

Figure 4:
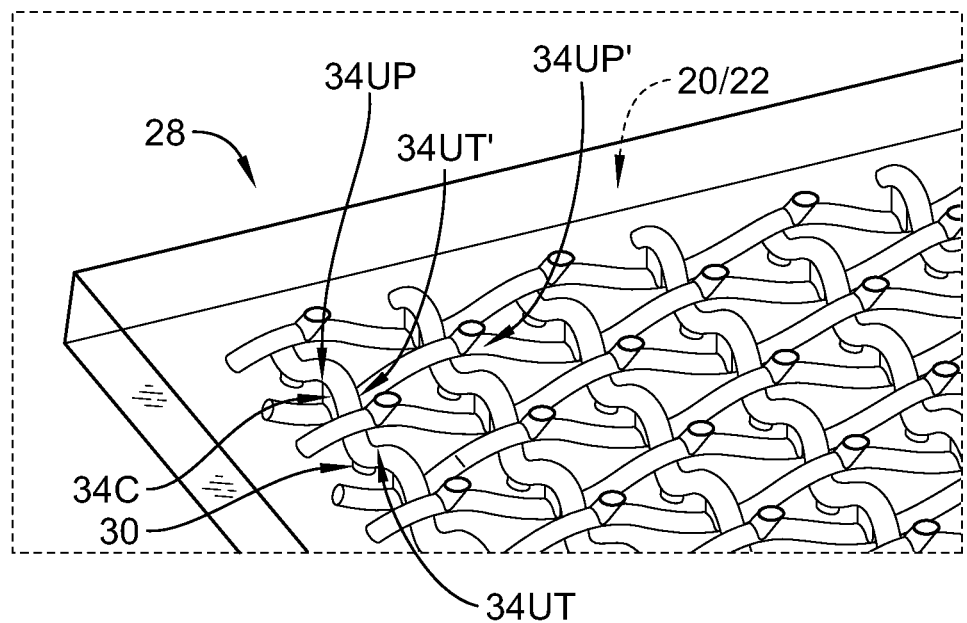
FIG. 4 is a detail view of a portion of the first cooling air subsystem of FIG. 3 showing that the one set of cooling passages includes cross-feed portions fluidly coupling the one set of cooling passages to the another set of cooling passages.

For the purposes of promoting an understanding of the principles of the disclosure, reference will now be made to a number of illustrative embodiments illustrated in the drawings and specific language will be used to describe the same.

Referring now to FIG. 1, an illustrative vane 10 adapted for use in a turbine section of a gas turbine engine is shown. The vane 10 includes an inner platform 12, an outer platform 14, and an airfoil 16. The inner platform 12 and the outer platform 14 are spaced apart in a radial direction R from one another and cooperate to define a flow path 18 for hot, high-pressure gasses moving through the turbine section of the gas turbine engine. The airfoil 16 extends in the radial direction R from the inner platform 12 to the outer platform 14 across the flow path 18 to interact with the hot gasses moving through the flow path 18.

The illustrative airfoil 16 includes a pressure side wall 20 and a suction side wall 22 arranged opposite the pressure side wall 20 as shown in FIGS. 1 and 2. The pressure side wall 20 and the suction side wall 22 cooperate to define the exterior of the airfoil 16 as well as a leading edge 24L and a trailing edge 24T of the airfoil 16. The leading edge 24L is arranged opposite the trailing edge 24T.

The airfoil 16 illustratively includes a cooling air distribution system 26 as suggested by FIGS. 1 and 2. The cooling air distribution system 26 is formed internal to at least one of the pressure and suction side walls 20, 22. The cooling air distribution system 26 is configured to distribute relatively cool air referred to hereinafter as cooling air through the airfoil 16 to cool the airfoil 16.

In the illustrative embodiment, the cooling air distribution system 26 includes one or more different arrays of cooling passages that are arranged to extend along various portions of the airfoil 16 to provide different amounts of cooling. At least one array of cooling passages selected from the different arrays of passages described below with reference to FIGS. 6-8, FIGS. 9-11, and FIGS. 22-25 is arranged to extend along the leading edge 24L of the airfoil 16 as shown in FIG. 1. At least one array of cooling passages selected from the different arrays of passages described below with reference to FIGS. 3-5, FIGS. 6-8, FIGS. 9-11, FIGS. 12-14, and FIGS. 22-25 is arranged to extend along the trailing edge 24T of the airfoil 16 as shown in FIG. 1. At least one array of cooling passages selected from the different arrays of passages described below with reference to FIGS. 6-8 and FIGS. 22-25 is arranged to extend along the suction side wall 22 as shown in FIG. 1. At least one array of cooling passages selected from the different arrays of passages described below with reference to FIGS. 3-5, FIGS. 12-14, FIGS. 15-17, FIGS. 18-20, and FIGS. 21-22 is arranged to extend along the pressure side wall 20 as shown in FIG. 2.

In some embodiments, one or more suitable arrays of cooling passages included in the cooling air distribution system 26 may be arranged to extend along other suitable portions of the airfoil 16. Additionally, in other embodiments, one of the arrays of cooling passages included in the system 26 may be arranged to extend along multiple portions of the airfoil 16, such as at least two of the leading edge 24L, the trailing edge 24T, the suction side wall 22, and the pressure side wall 20.

Referring now to FIG. 3, the cooling air distribution system 26 may include a cooling air subsystem 28. The cooling air subsystem 28 illustratively includes feed ports 30 and discharge ports 32. The feed ports 30 are configured to receive cooling air from a source of cooling air. The discharge ports 32 are fluidly coupled to the feed ports 30 and configured to discharge cooling air provided to the feed ports 30. The discharge ports 32 are located exteriorly of the feed ports 30 such that the discharge ports 32 are closer to one of the pressure and suction side walls 20, 22 than the feed ports 30.

The cooling air subsystem 28 also illustratively includes an array of cooling passages 34 interconnecting the feed ports 30 and the discharge ports 32 as shown in FIG. 3. The cooling passages 34 are configured to conduct cooling air exteriorly from the feed ports 30 to the discharge ports 32 so that at least some of the cooling air provided to the feed ports 30 is discharged by the discharge ports 32.

The array of cooling passages 34 illustratively includes one set of cooling passages 34A and another set of cooling passages 34B interwoven with the passages 34A to form a mesh cooling pattern 34P as shown in FIG. 3. The cooling passages 34A are arranged to extend in a direction D1 and the cooling passages 34B are arranged to extend in a direction D2 perpendicular to the direction D1. Each of the set of cooling passages 34A is embodied as, or otherwise includes, a passage having a generally sinusoidal shape and a circular cross-sectional shape. Similarly, each of the set of cooling passages 34B is embodied as, or otherwise includes, a passage having a generally sinusoidal shape and a circular cross-sectional shape.

The set of cooling passages 34A are illustratively spaced apart from one another in the direction D2 as shown in FIG. 3. Each of the cooling passages 34A includes undulated portions 34U having peaks 34UP interconnected with troughs 34UT. Additionally, each of the cooling passages 34A includes cross-feed portions 34C interconnected with and extending interiorly away from the peaks 34UP. Adjacent cooling passages 34A (e.g., cooling passages 34A1, 34A2) are arranged such that the troughs 34UT of one passage (e.g., 34A1) and the peaks 34UP of the adjacent passage (e.g., 34A2) are aligned with each other as the adjacent passages 34A extend in the direction D1.

The set of cooling passages 34B are illustratively spaced apart from one another in the direction D1 as shown in FIG. 3. Each of the cooling passages 34B includes undulated portions 34U' having peaks 34UP' interconnected with troughs 34UT'. Adjacent cooling passages 34B (e.g., cooling passages 34B1, 34B2) are arranged such that the troughs 34UT' of one passage (e.g., 34B1) and the peaks 34UP' of the adjacent passage (e.g., 34B2) are aligned with each other as the adjacent passages 34B extend in the direction D2.

Referring now to FIG. 4, the feed ports 30 are illustratively arranged to provide cooling air directly to the troughs 34UT of each of the set of cooling passages 34A. The discharge ports 32 are arranged to discharge cooling air directly from the peaks 34UP' of each of the set of cooling passages 34B. The cross-feed portions 34C of the cooling passages 34A intersect the troughs 34UT' of the cooling passages 34B. Such intersection permits cooling air provided by the feed ports 30 to each of the passages 34A to be conducted through one of the passages 34B before being discharged by one of the discharge ports 32 toward at least one of the pressure and suction side walls 20, 22 during operation of the airfoil 16.

Figure 5:
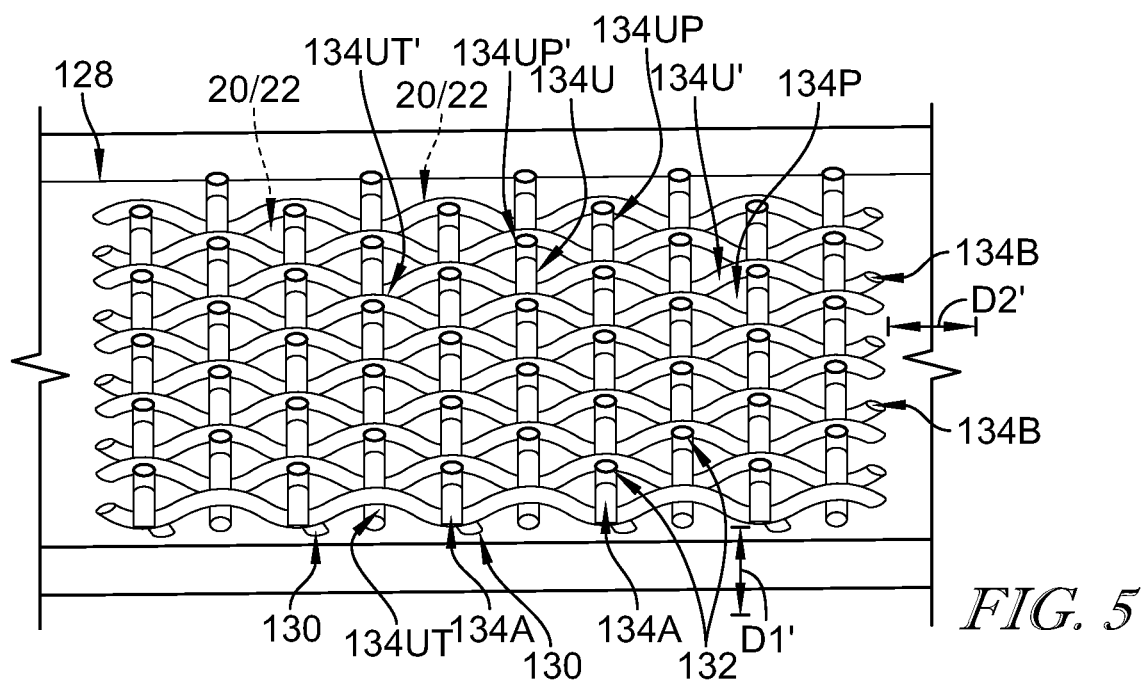
FIG. 5 is a top view of a second cooling air subsystem similar to the first cooling air subsystem of FIG. 3 that may be included in the cooling air distribution system.

Referring now to FIG. 5, an illustrative cooling air subsystem 128 may be included in the cooling air distribution system 26. The cooling air subsystem 128 includes feed ports 130, discharge ports 132, one set of cooling passages 134A, and another set of cooling passages 1346. The discharge ports 132 are located exteriorly of the feed ports 130 such that the discharge ports 132 are closer to one of the pressure and suction side walls 20, 22 than the feed ports 130. Each of the cooling passages 134A is embodied as, or otherwise include, a passage having a generally sinusoidal shape and a circular cross-sectional shape. Similarly, each of the set of cooling passages 134B is embodied as, or otherwise includes, a passage having a generally sinusoidal shape and a circular cross-sectional shape.

The cooling passages 134A are illustratively arranged to extend in a direction D1' and spaced apart from one another in the direction D2' perpendicular to the direction D1' as shown in FIG. 5. The cooling passages 134B are interwoven with the cooling passages 134A to form a mesh cooling pattern 134P. The cooling passages 134B are arranged to extend in the direction D2' and spaced apart from one another in the direction D1'.

Each of the cooling passages 134A illustratively includes undulated portions 134U having peaks 134UP interconnected with troughs 134UT as shown in FIG. 5. Each of the cooling passages 134B illustratively includes undulated portions 134U' having peaks 134UP' interconnected with troughs 134UT'.

The feed ports 130 are illustratively arranged to provide cooling air directly to at least one trough 134UT' of each of the set of cooling passages 134B as shown in FIG. 5. The discharge ports 132 are arranged to discharge cooling air directly from the peaks 134UP of each of the set of cooling passages 134A.

Figure 6:
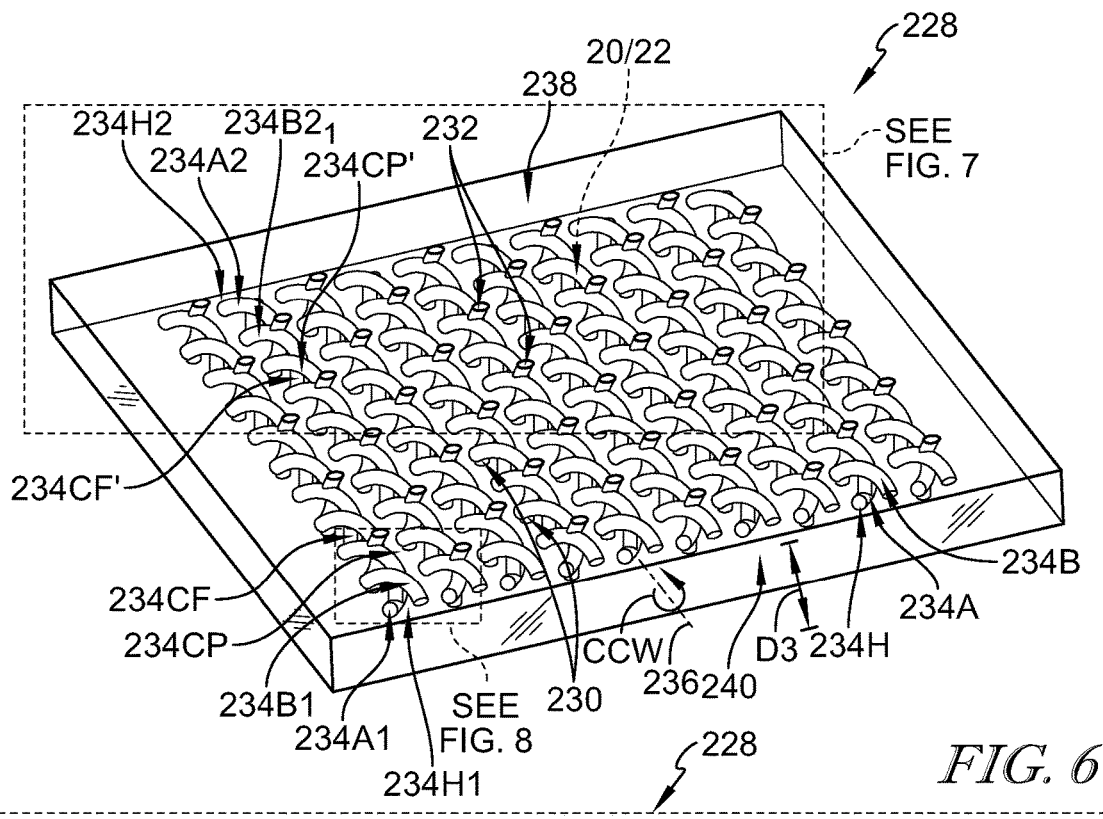
FIG. 6 is a perspective view of a third cooling air subsystem that may be included in the cooling air distribution system shown in FIG. 1 showing that the third cooling air subsystem includes one set of cooling passages having a generally corkscrew-type shape and a circular cross-sectional shape and another set of cooling passages having a generally corkscrew-type shape and a circular cross-sectional shape interwoven with, and arranged parallel to, the one set of cooling passages to form a helix cooling pattern.

Referring now to FIG. 6, an illustrative cooling air subsystem 228 may be included in the cooling air distribution system 26. The cooling air subsystem 228 includes feed ports 230 and discharge ports 232. The feed ports 230 are configured to receive cooling air from a source of cooling air. The discharge ports 232 are fluidly coupled to the feed ports 230 and configured to discharge cooling air provided to the feed ports 230. The discharge ports 232 are located exteriorly of the feed ports 230 such that the discharge ports 232 are closer to one of the pressure and suction side walls 20, 22 of the airfoil 16 than the feed ports 230.

The cooling air subsystem 228 also illustratively includes an array of cooling passages 234 interconnecting the feed ports 230 and the discharge ports 232 as shown in FIG. 6. The cooling passages 234 are configured to conduct cooling air exteriorly from the feed ports 230 to the discharge ports 232 so that at least some of the cooling air provided to the feed ports 230 is discharged by the discharge ports 232.

The array of cooling passages 234 illustratively includes one set of cooling passages 234A and another set of cooling passages 234B interwoven with the passages 234A as shown in FIG. 6. The cooling passages 234A, 234B are arranged to extend parallel to one another in a direction D3. Each of the set of cooling passages 234A is embodied as, or otherwise includes, a passage having a generally corkscrew-type shape and a circular cross-sectional shape. Similarly, each of the set of cooling passages 234B is embodied as, or otherwise includes, a passage having a generally corkscrew-type shape and a circular cross-sectional shape.

Each of the set of cooling passages 234B illustratively cooperates with one of the set of passages 234A to define a helix shape 234H as shown in FIG. 6. Each of the passages 234A extends around a longitudinal axis 236 in a counter-clockwise direction CCW. One of the passages 234B extends around the longitudinal axis 236 in the counter-clockwise direction CCW.

Figure 7:
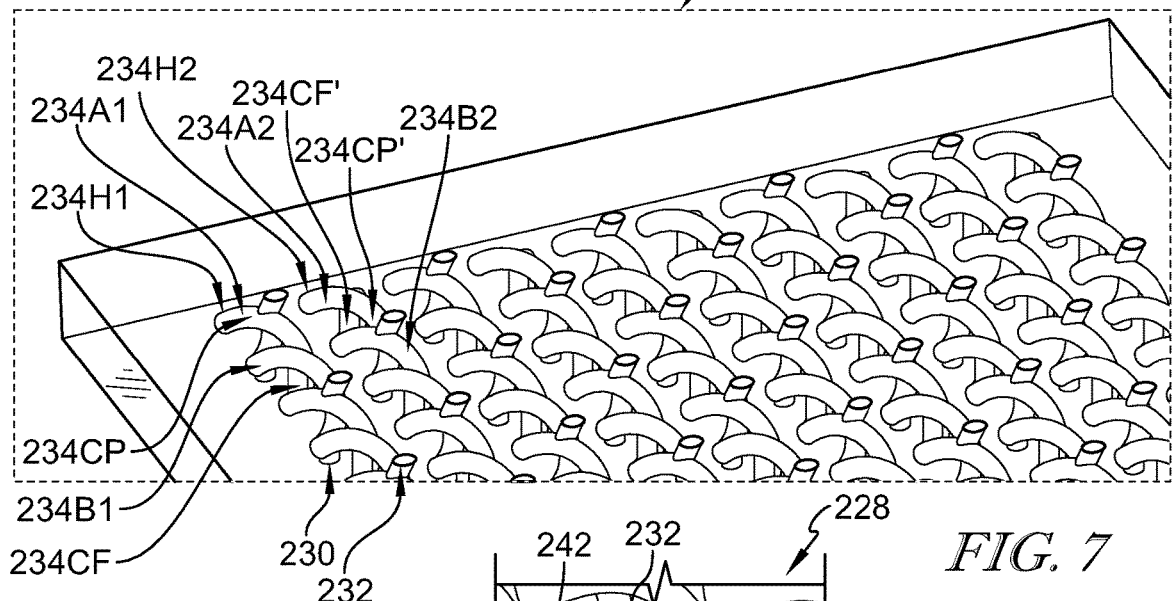
FIG. 7 is a detail view of a portion of the third cooling air subsystem of FIG. 6 showing that the one set of cooling passages includes cross-feed portions fluidly coupling the one set of cooling passages to the another set of cooling passages.

Cooling passages 234A1 and 234B1 illustratively cooperate to define a helix shape 234H1 as shown in FIGS. 6 and 7. The feed ports 230 are arranged to provide cooling air directly to the cooling passage 234B1 and the discharge ports 232 are arranged to discharge cooling air directly from the cooling passage 234A1. The cooling passage 234A1 includes coil portions 234CP and cross-feed portions 234CF interconnected with the coil portions 234CP and extending exteriorly away from at least a part of the coil portions 234CP to intersect the cooling passage 23461. Such intersection permits cooling air provided by the feed ports 230 to the passage 234B1 to be conducted through the passage 234A1 before being discharged by one of the discharge ports 232 toward at least one of the pressure and suction side walls 20, 22 of the airfoil 16 during operation of the airfoil 16.

Cooling passages 234A2 and 234B2 illustratively cooperate to define a helix shape 234H2 adjacent the shape 234H1 as shown in FIGS. 6 and 7. The feed ports 230 are arranged to provide cooling air directly to the cooling passage 234A2 and the discharge ports 232 are arranged to discharge cooling air directly from the passage 234B2. The cooling passage 234A2 includes coil portions 234CP' and cross-feed portions 234CF' interconnected with the coil portions 234CP' and extending interiorly away from at least a part of the coil portions 234CP' to intersect the cooling passages 234B2. Such intersection permits cooling air provided by the feed ports 230 to the passage 234A2 to be conducted through the passage 234B2 before being discharged by one of the discharge ports 232 toward at least one of the pressure and suction side walls 20, 22 of the airfoil 16 during operation of the airfoil 16.

Figure 8:
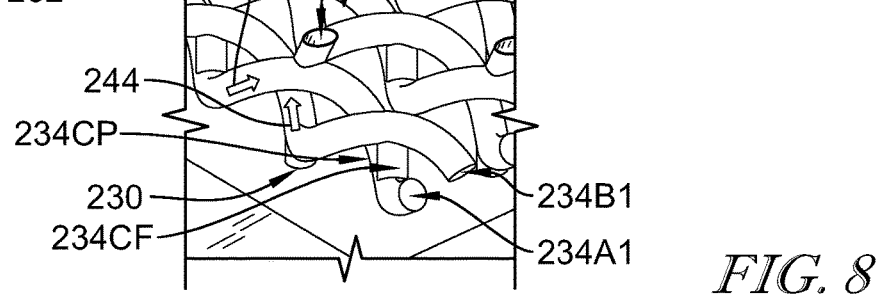
FIG. 8 is a detail view of another portion of the third cooling air subsystem of FIG. 6 showing that cooling air may be conducted by the one set of cooling passages and the another set of cooling passages in the same direction or in different directions.

Referring now to FIGS. 6 and 8, in some embodiments, cooling air is conducted through each of the sets of cooling passages 234A, 234B from a portion 238 of the airfoil 16 to a portion 240 of the airfoil as indicated by arrow 242. In other embodiments, cooling air may be conducted through each of the sets of cooling passages 234A, 234B from the portion 240 to the portion 238 as indicated by arrow 244.

Figure 9:
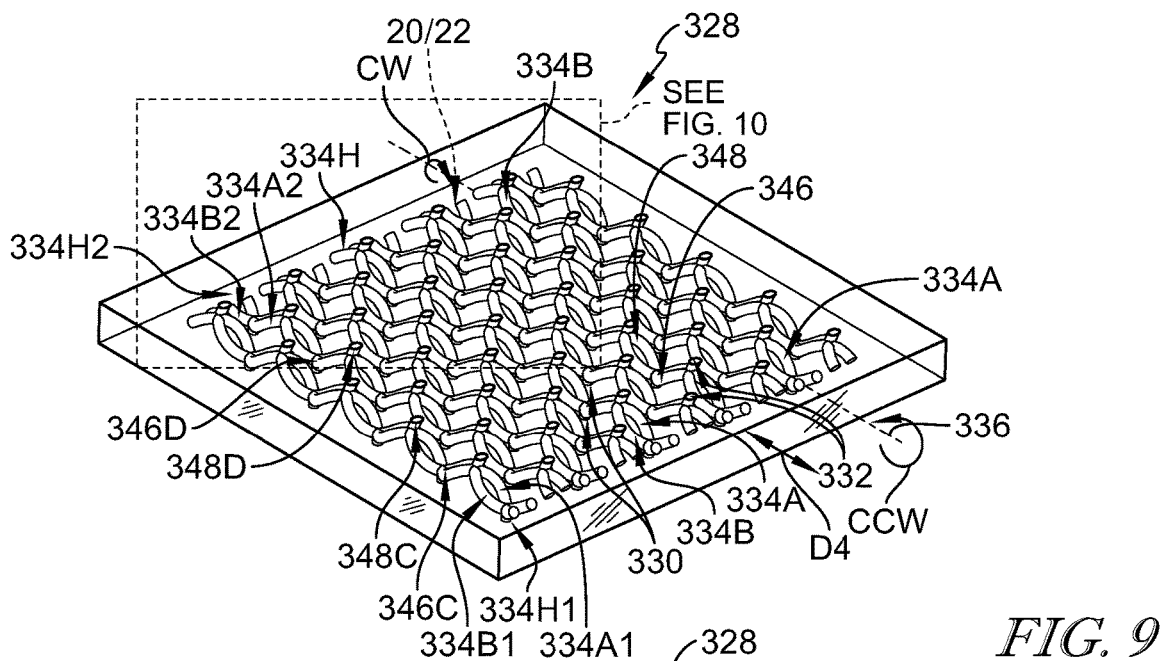
FIG. 9 is a perspective view of a fourth cooling air subsystem that may be included in the cooling air distribution system shown in FIG. 1 showing that the fourth cooling air subsystem includes one set of cooling passages having a generally corkscrew-type shape and a circular cross-sectional shape and another set of cooling passages having a generally corkscrew-type shape and a circular cross-sectional shape interwoven with, and arranged parallel to, the one set of cooling passages.

Referring now to FIG. 9, an illustrative cooling air subsystem 328 may be included in the cooling air distribution system 26. The cooling air subsystem 328 includes feed ports 330 and discharge ports 332. The feed ports 330 are configured to receive cooling air from a source of cooling air. The discharge ports 332 are fluidly coupled to the feed ports 330 and configured to discharge cooling air provided to the feed ports 330. The discharge ports 332 are located exteriorly of the feed ports 330 such that the discharge ports 332 are closer to one of the pressure and suction side walls 20, 22 of the airfoil 16 than the feed ports 330.

The cooling air subsystem 328 also illustratively includes an array of cooling passages 334 interconnecting the feed ports 330 and the discharge ports 332 as shown in FIG. 9. The cooling passages 334 are configured to conduct cooling air exteriorly from the feed ports 330 to the discharge ports 332 so that at least some of the cooling air provided to the feed ports 330 is discharged by the discharge ports 332.

The array of cooling passages 334 illustratively includes one set of cooling passages 334A and another set of cooling passages 334B interwoven with the passages 334A as shown in FIG. 9. The cooling passages 334A, 334B are arranged to extend parallel to one another in a direction D4. Each of the set of cooling passages 334A is embodied as, or otherwise includes, a passage having a generally corkscrew-type shape and a circular cross-sectional shape. Similarly, each of the set of cooling passages 334B is embodied as, or otherwise includes, a passage having a generally corkscrew-type shape and a circular cross-sectional shape.

Each of the set of cooling passages 334B illustratively cooperates with one of the set of passages 334A to define a helix shape 334H as shown in FIG. 9. Each of the passages 334A extends around a longitudinal axis 336 in a counterclockwise direction CCW. One of the passages 334B extends around the longitudinal axis 336 in a clockwise direction CW opposite the counterclockwise direction CCW.

The sets of cooling passages 334A, 334B illustratively intersect one another at intersection locations 346, 348 spaced apart from one another in the direction D4 as shown in FIG. 9. The intersection locations 346 are located interiorly of the intersection locations 348. The intersection locations 346 are fluidly coupled to the feed ports 330 and the feed ports 330 are configured to provide cooling air directly to the intersection locations 346. The intersection locations 348 are fluidly coupled to the discharge ports 332 and the discharge ports 332 are configured to discharge cooling air provided by the ports 330 directly from the intersection locations 348.

Figure 10:
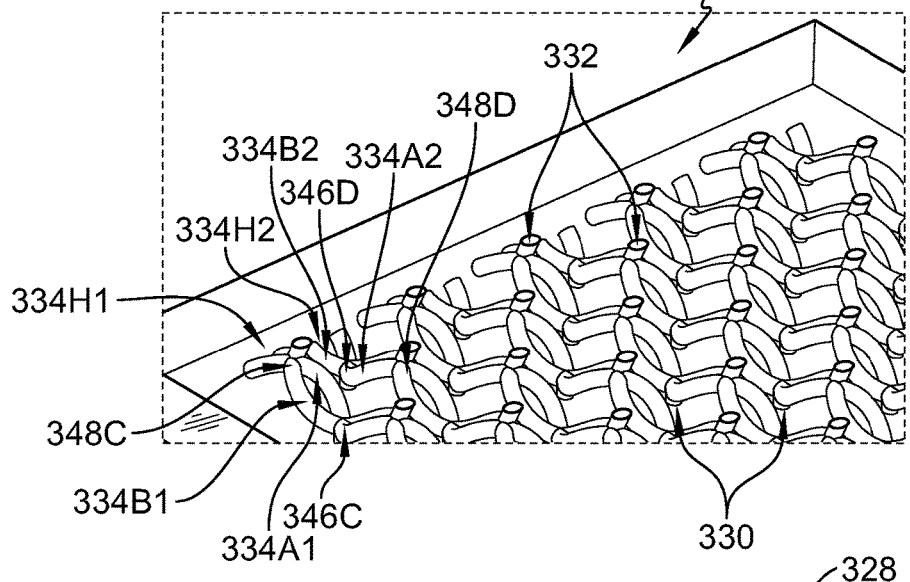
FIG. 10 is a detail view of a portion of the fourth cooling air subsystem of FIG. 9 showing that the one set of cooling passages and the another set of cooling passages intersect one another at first intersection locations and at second intersection locations.

Cooling passages 334A1 and 334B1 illustratively cooperate to define a helix shape 334H1 as shown in FIGS. 9 and 10. Cooling passages 334A1 and 334B1 intersect at first intersection locations 346C and at second intersection locations 348C.

Cooling passages 334A2 and 33462 illustratively cooperate to define a helix shape 334H2 as shown in FIGS. 9 and 10. Cooling passages 334A2 and 33462 intersect at first intersection locations 346D and at second intersection locations 348D.

Figure 11:
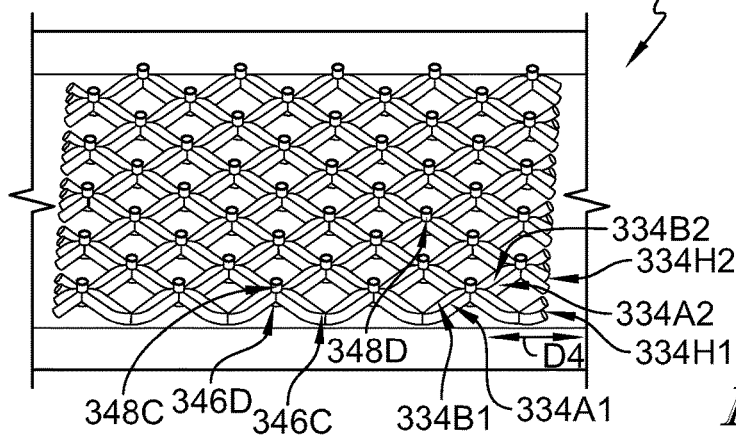
FIG. 11 is a side elevation view of the fourth cooling air subsystem of FIG. 9 showing that the first intersection locations are located exteriorly of the second intersection locations.

The helix shapes 334H1 and 334H2 are arranged adjacent one another as shown in FIG. 11. The intersection locations 346C are aligned with the intersection locations 348D as the passages 334A1, 33461, 334A2, 33462 extend in the direction D4. The intersection locations 348C are aligned with the intersection locations 346D as the passages 334A1, 33461, 334A2, 33462 extend in the direction D4.

Figure 12:
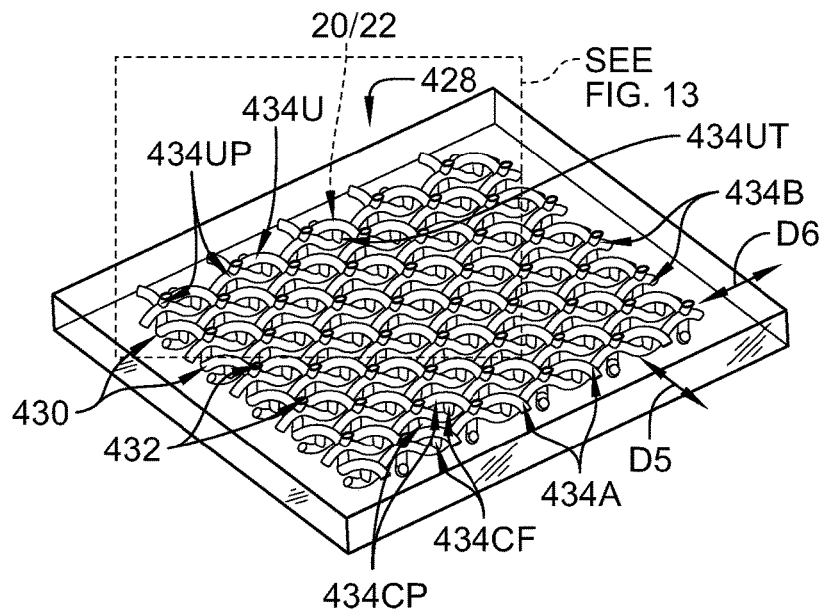
FIG. 12 is a perspective view of a fifth cooling air subsystem that may be included in the cooling air distribution system shown in FIG. 1 showing that the fifth cooling air subsystem includes one set of cooling passages having a generally corkscrew-type shape and a circular cross-sectional shape and another set of cooling passages having a generally sinusoidal shape and a circular cross-sectional shape interwoven with, and arranged perpendicular to, the one set of cooling passages.

Referring now to FIG. 12, an illustrative cooling air subsystem 428 may be included in the cooling air distribution system 26. The cooling air subsystem 428 illustratively includes feed ports 430 and discharge ports 432. The feed ports 430 are configured to receive cooling air from a source of cooling air. The discharge ports 432 are fluidly coupled to the feed ports 430 and configured to discharge cooling air provided by the feed ports 430. The discharge ports 432 are located exteriorly of the feed ports 430 such that the discharge ports 432 are closer to one of the pressure and suction side walls 20, 22 than the feed ports 430.

The cooling air subsystem 428 also illustratively includes an array of cooling passages 434 interconnecting the feed ports 430 and the discharge ports 432 as shown in FIG. 12. The cooling passages 434 are configured to conduct cooling air exteriorly from the feed ports 430 to the discharge ports 432 so that at least some of the cooling air provided to the feed ports 430 is discharged by the discharge ports 432.

The array of cooling passages 434 illustratively includes one set of cooling passages 434A and another set of cooling passages 434B interwoven with the passages 434A as shown in FIG. 12. The cooling passages 434A are arranged to extend in a direction D5 and the cooling passages 434B are arranged to extend in a direction D6 perpendicular to the direction D5. Each of the set of cooling passages 434A is embodied as, or otherwise includes, a passage having a generally corkscrew-type shape and a circular cross-sectional shape. Each of the set of cooling passages 4346 is embodied as, or otherwise includes, a passage having a generally sinusoidal shape and a circular cross-sectional shape.

Figure 13:
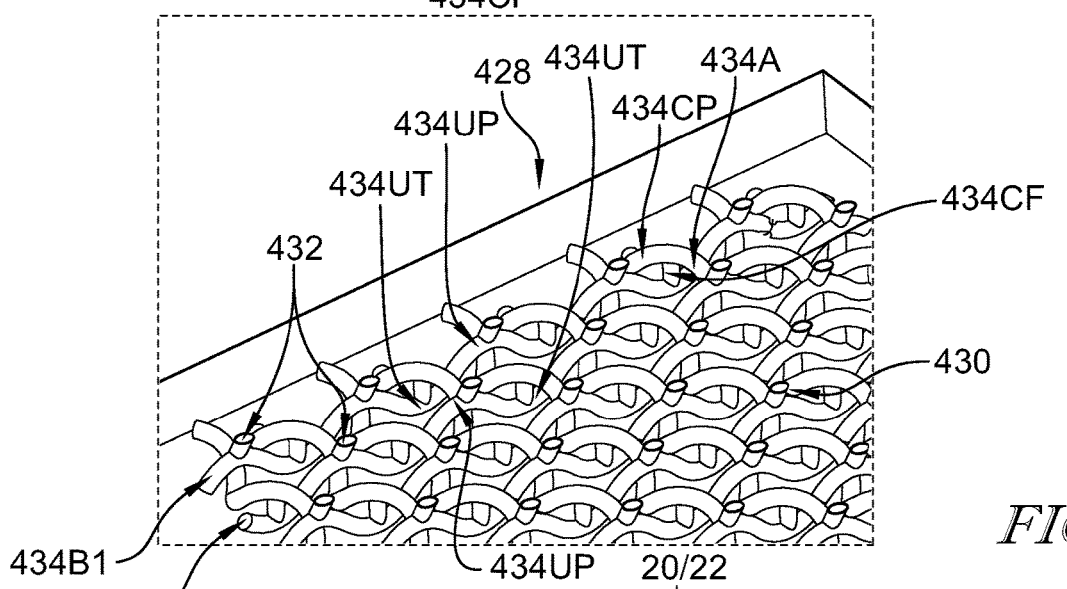
FIG. 13 is a detail view of a portion of the fifth cooling air subsystem of FIG. 12 showing that the one set of cooling passages includes cross-feed portions fluidly coupling the one set of cooling passages to the another set of cooling passages.

The set of cooling passages 434A are illustratively spaced apart from one another in the direction D6 as shown in FIGS. 12 and 13. Each of the cooling passages 434A includes coil portions 434CP and cross-feed portions 434CF interconnected with the portions 434CP and extending interiorly away from at least a part of the coil portions 434CP.

The set of cooling passages 4346 are illustratively spaced apart from one another in the direction D5 as shown in FIGS. 12 and 13. Each of the cooling passages 4346 includes undulated portions 434U having peaks 434UP interconnected with troughs 434UT. Adjacent cooling passages 4346 (e.g., cooling passages 43461, 43462) are arranged such that the troughs 434UT of one passage (e.g., 43461) and the peaks 434UP of the adjacent passage (e.g., 43462) are aligned with each other as the adjacent passages 4346 extend in the direction D6.

Referring now to FIG. 13, the feed ports 430 are illustratively arranged to provide cooling air directly to the coil portions 434CP of each of the set of cooling passages 434A. The discharge ports 432 are arranged to discharge cooling air directly from the peaks 434UP of each of the set of cooling passages 4346. The cross-feed portions 434CF of the cooling passages 434A intersect the troughs 434UT of the cooling passages 4346. Such intersection permits cooling air provided by the feed ports 430 to each of the passages 434A to be conducted through one of the passages 4346 before being discharged by one of the discharge ports 432 toward at least one of the pressure and suction side walls 20, 22 during operation of the airfoil 16.

Figure 14:
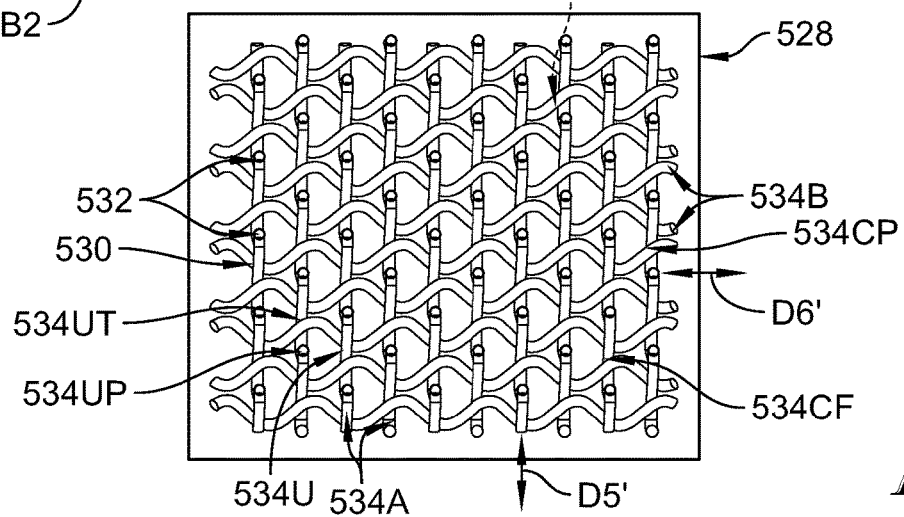
FIG. 14 is a top view of a sixth cooling air subsystem similar to the fifth cooling air subsystem of FIG. 12 that may be included in the cooling air distribution system.

Referring now to FIG. 14, an illustrative cooling air subsystem 528 may be included in the cooling air distribution system 26. The cooling air subsystem 528 includes feed ports 530, discharge ports 532, one set of cooling passages 534A, and another set of cooling passages 534B. The discharge ports 532 are located exteriorly of the feed ports 530 such that the discharge ports 532 are closer to one of the pressure and suction side walls 20, 22 than the feed ports 530. Each of the cooling passages 534A is embodied as, or otherwise include, a passage having a generally sinusoidal shape and a circular cross-sectional shape. Each of the set of cooling passages 534B is embodied as, or otherwise includes, a passage having a generally corkscrew-type shape and a circular cross-sectional shape.

The cooling passages 534A are illustratively arranged to extend in a direction D5' and spaced apart from one another in the direction D6' perpendicular to the direction D5' as shown in FIG. 14. The cooling passages 534B are interwoven with the cooling passages 534A, arranged to extend in the direction D6,' and spaced apart from one another in the direction D5'.

Each of the cooling passages 534A illustratively includes undulated portions 534U having peaks 534UP interconnected with troughs 534UT as shown in FIG. 14. Each of the cooling passages 534B illustratively includes coil portions 534CP interconnected with cross-feed portions 534CF.

The feed ports 530 are illustratively arranged to provide cooling air directly to at least one coil portion 534CP of each of the set of cooling passages 534B as shown in FIG. 14. The discharge ports 532 are arranged to discharge cooling air directly from the peaks 534UP of each of the set of cooling passages 534A.

Figure 15:
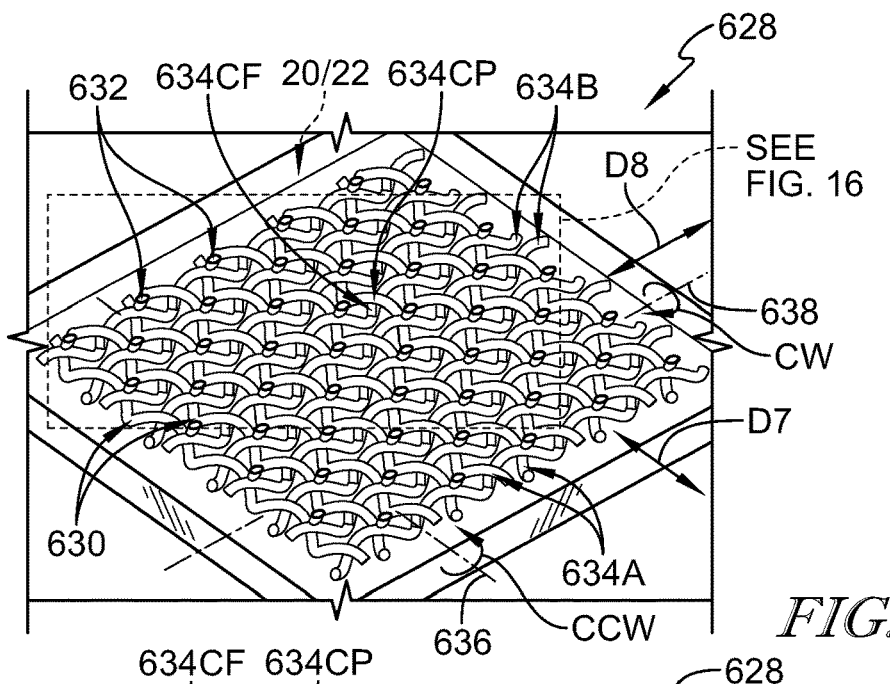
FIG. 15 is a perspective view of a seventh cooling air subsystem that may be included in the cooling air distribution system shown in FIG. 1 showing that the seventh cooling air subsystem includes one set of cooling passages having a generally corkscrew-type shape and a circular cross-sectional shape and another set of cooling passages having a generally corkscrew-type shape and a circular cross-sectional shape interwoven with, and arranged perpendicular to, the one set of cooling passages.

Referring now to FIG. 15, an illustrative cooling air subsystem 628 may be included in the cooling air distribution system 26. The cooling air subsystem 628 includes feed ports 630 and discharge ports 632. The feed ports 630 are configured to receive cooling air from a source of cooling air. The discharge ports 632 are fluidly coupled to the feed ports 630 and configured to discharge cooling air provided to the feed ports 630. The discharge ports 632 are located exteriorly of the feed ports 630 such that the discharge ports 632 are closer to one of the pressure and suction side walls 20, 22 of the airfoil 16 than the feed ports 630.

The cooling air subsystem 628 also illustratively includes an array of cooling passages 634 interconnecting the feed ports 630 and the discharge ports 632 as shown in FIG. 15. The cooling passages 634 are configured to conduct cooling air exteriorly from the feed ports 630 to the discharge ports 632 so that at least some of the cooling air provided to the feed ports 630 is discharged by the discharge ports 632.

The array of cooling passages 634 illustratively includes one set of cooling passages 634A and another set of cooling passages 634B interwoven with the passages 634A as shown in FIG. 15. The cooling passages 634A are arranged to extend in a direction D7 and the cooling passages 634B are arranged to extend in a direction D8 perpendicular to the direction D7. Each of the set of cooling passages 634A is embodied as, or otherwise includes, a passage having a generally corkscrew-type shape and a circular cross-sectional shape. Similarly, each of the set of cooling passages 634B is embodied as, or otherwise includes, a passage having a generally corkscrew-type shape and a circular cross-sectional shape.

Figure 16:
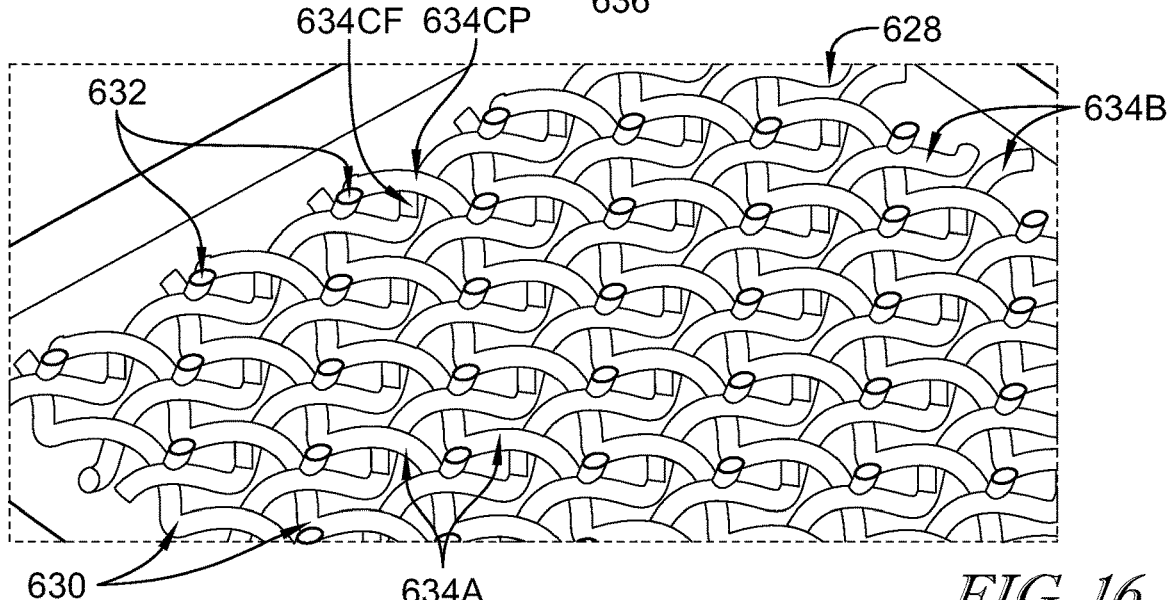
FIG. 16 is a detail view of a portion of the seventh cooling air subsystem of FIG. 15 showing that the one set of cooling passages includes cross-feed portions fluidly coupling the one set of cooling passages to the another set of cooling passages.

Each of the illustrative cooling passages 634A extends around a longitudinal axis 636 in a counterclockwise direction CCW as shown in FIGS. 15 and 16. Each of the illustrative cooling passages 634B extends around a longitudinal axis 638 perpendicular to the longitudinal axis 636 in a clockwise direction CW.

The feed ports 630 are arranged to provide cooling air directly to the cooling passages 634A and the discharge ports 632 are arranged to discharge cooling air directly from the cooling passages 634B as shown in FIGS. 15 and 16. The cooling passages 634A include coil portions 634CP and cross-feed portions 634CF interconnected with the coil portions 634CP and extending interiorly away from at least one of the coil portions 634CP to intersect the cooling passages 634B. Such intersection permits cooling air provided by the feed ports 630 to the cooling passages 634A to be conducted through one of the cooling passages 634B before being discharged by one of the discharge ports 232 toward at least one of the pressure and suction side walls 20, 22 of the airfoil 16 during operation of the airfoil 16.

Figure 17:
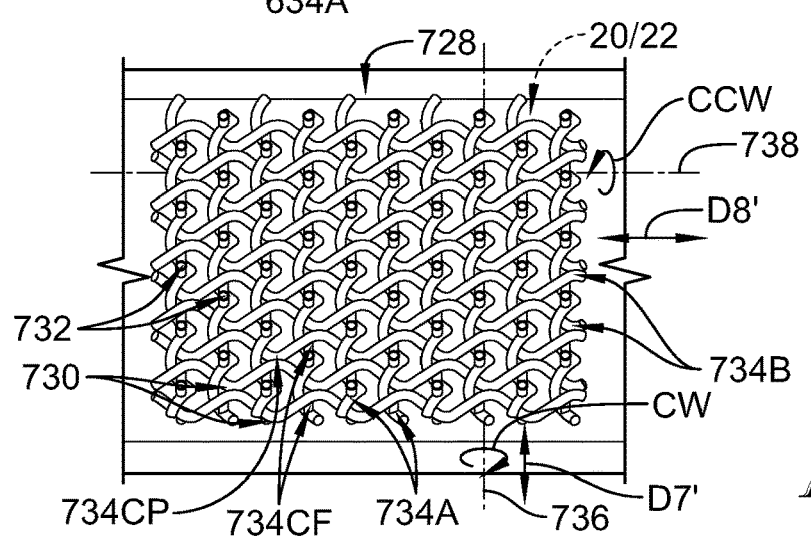
FIG. 17 is a top view of an eighth cooling air subsystem similar to the seventh cooling air subsystem of FIG. 15 that may be included in the cooling air distribution system.

Referring now to FIG. 17, an illustrative cooling air subsystem 728 may be included in the cooling air distribution system 26. The cooling air subsystem 728 includes feed ports 730 and discharge ports 732. The feed ports 730 are configured to receive cooling air from a source of cooling air. The discharge ports 732 are fluidly coupled to the feed ports 730 and configured to discharge cooling air provided to the feed ports 730. The discharge ports 732 are located exteriorly of the feed ports 730 such that the discharge ports 732 are closer to one of the pressure and suction side walls 20, 22 of the airfoil 16 than the feed ports 730.

The cooling air subsystem 728 also illustratively includes an array of cooling passages 734 interconnecting the feed ports 730 and the discharge ports 732 as shown in FIG. 17. The cooling passages 734 are configured to conduct cooling air exteriorly from the feed ports 730 to the discharge ports 732 so that at least some of the cooling air provided to the feed ports 730 is discharged by the discharge ports 732.

The array of cooling passages 734 illustratively includes one set of cooling passages 734A and another set of cooling passages 734B interwoven with the passages 734A as shown in FIG. 17. The cooling passages 734A are arranged to extend in a direction D7' and the cooling passages 734B are arranged to extend in a direction D8' perpendicular to the direction D7'. Each of the set of cooling passages 734A is embodied as, or otherwise includes, a passage having a generally corkscrew-type shape and a circular cross-sectional shape. Similarly, each of the set of cooling passages 734B is embodied as, or otherwise includes, a passage having a generally corkscrew-type shape and a circular cross-sectional shape.

Each of the illustrative cooling passages 734A extends around a longitudinal axis 736 in a clockwise direction CW as shown in FIG. 17. Each of the illustrative cooling passages 734B extends around a longitudinal axis 738 perpendicular to the longitudinal axis 736 in a counterclockwise direction CCW.

The feed ports 730 are arranged to provide cooling air directly to the cooling passages 734B and the discharge ports 732 are arranged to discharge cooling air directly from the cooling passages 734B as shown in FIG. 17. The cooling passages 734B include coil portions 734CP and cross-feed portions 734CF interconnected with the coil portions 734CP and extending interiorly away from at least one of the coil portions 734CP to intersect the cooling passages 734A. Such intersection permits cooling air provided by the feed ports 730 to the cooling passages 734B to be conducted through one of the cooling passages 734A before being discharged by one of the discharge ports 732 toward at least one of the pressure and suction side walls 20, 22 of the airfoil 16 during operation of the airfoil 16.

Figure 18:
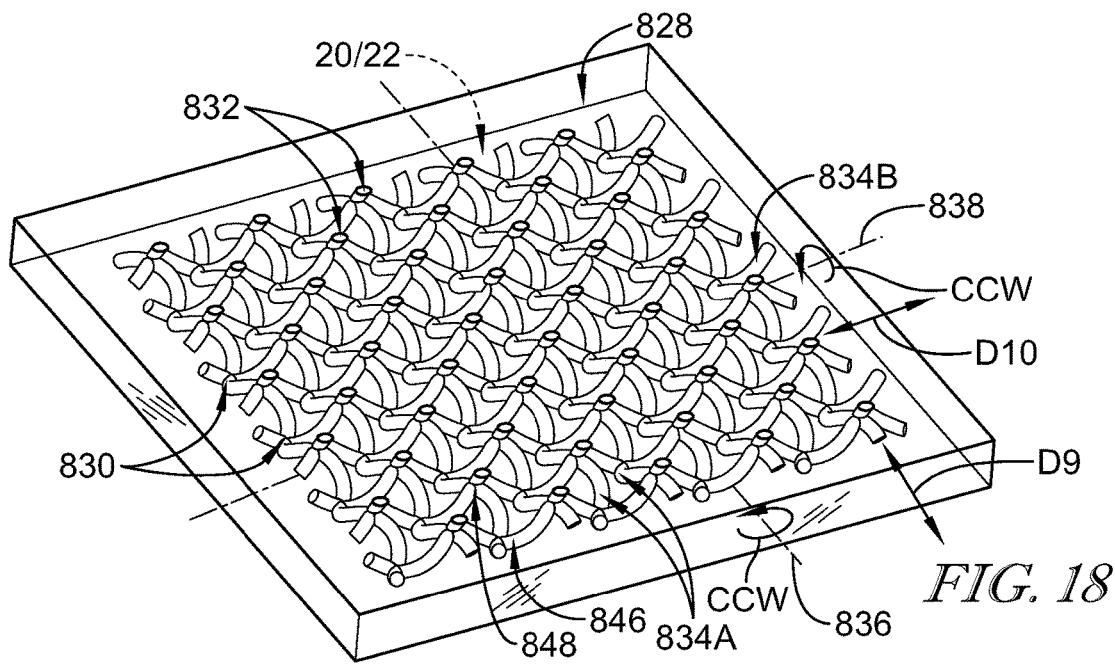
FIG. 18 is a perspective view of a ninth cooling air subsystem that may be included in the cooling air distribution system shown in FIG. 1 showing that the ninth cooling air subsystem includes one set of cooling passages having a generally corkscrew-type shape and a circular cross-sectional shape and another set of cooling passages having a generally corkscrew-type shape and a circular cross-sectional shape interwoven with, and arranged perpendicular to, the one set of cooling passages.

Referring now to FIG. 18, an illustrative cooling air subsystem 828 may be included in the cooling air distribution system 26. The cooling air subsystem 828 includes feed ports 830 and discharge ports 832. The feed ports 830 are configured to receive cooling air from a source of cooling air. The discharge ports 832 are fluidly coupled to the feed ports 830 and configured to discharge cooling air provided to the feed ports 830. The discharge ports 832 are located exteriorly of the feed ports 830 such that the discharge ports 832 are closer to one of the pressure and suction side walls 20, 22 of the airfoil 16 than the feed ports 830.

The cooling air subsystem 828 also illustratively includes an array of cooling passages 834 interconnecting the feed ports 830 and the discharge ports 832 as shown in FIG. 18. The cooling passages 834 are configured to conduct cooling air exteriorly from the feed ports 830 to the discharge ports 832 so that at least some of the cooling air provided to the feed ports 830 is discharged by the discharge ports 832.

The array of cooling passages 834 illustratively includes one set of cooling passages 834A and another set of cooling passages 834B interwoven with the passages 834A as shown in FIG. 18. The cooling passages 834A are arranged to extend in a direction D9 and the cooling passages 834B are arranged to extend in a direction D10 perpendicular to the direction D9. Each of the set of cooling passages 834A is embodied as, or otherwise includes, a passage having a generally corkscrew-type shape and a circular cross-sectional shape. Similarly, each of the set of cooling passages 834B is embodied as, or otherwise includes, a passage having a generally corkscrew-type shape and a circular cross-sectional shape.

Figure 19:
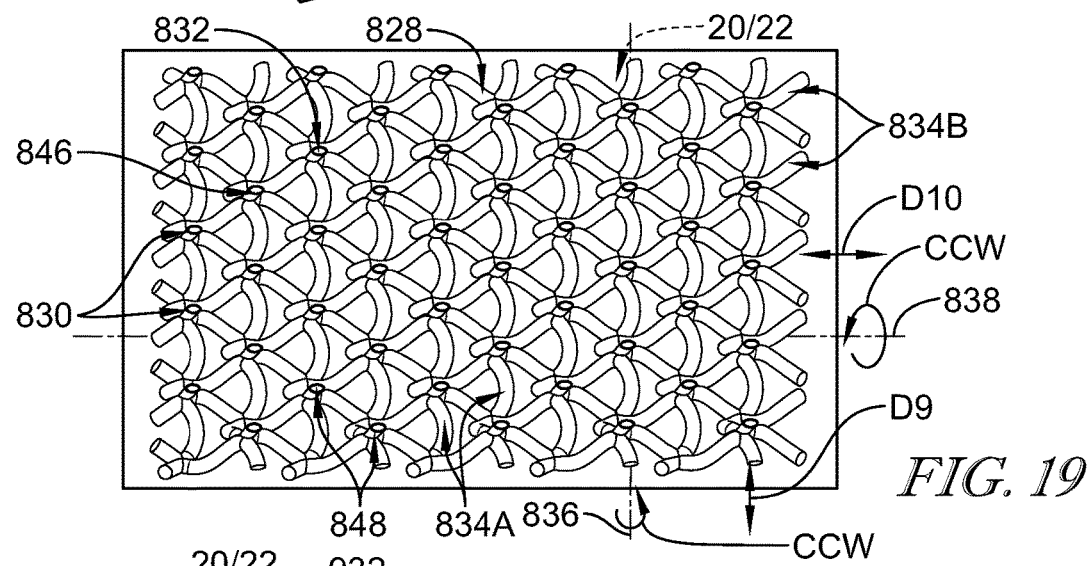
FIG. 19 is a top view of the ninth cooling air subsystem of FIG. 18 showing that the one set of cooling passages and the another set of cooling passages intersect one another at first intersection locations and at second intersection locations located exteriorly of the first intersection locations.

Each of the illustrative cooling passages 834A extends around a longitudinal axis 836 in a counterclockwise direction CCW as shown in FIGS. 18 and 19. Each of the illustrative cooling passages 834B extends around a longitudinal axis 838 perpendicular to the longitudinal axis 836 in the counterclockwise direction CCW.

The sets of cooling passages 834A, 834B illustratively intersect one another at intersection locations 846, 848 spaced apart from one another in the direction D9 as shown in FIGS. 18 and 19. The intersection locations 846 are located interiorly of the intersection locations 848. The intersection locations 846 are fluidly coupled to the feed ports 830 and the feed ports 830 are configured to provide cooling air directly to the intersection locations 846. The intersection locations 848 are fluidly coupled to the discharge ports 832 and the discharge ports 832 are configured to discharge cooling air provided to the ports 830 directly from the intersection locations 848.

Figure 20:
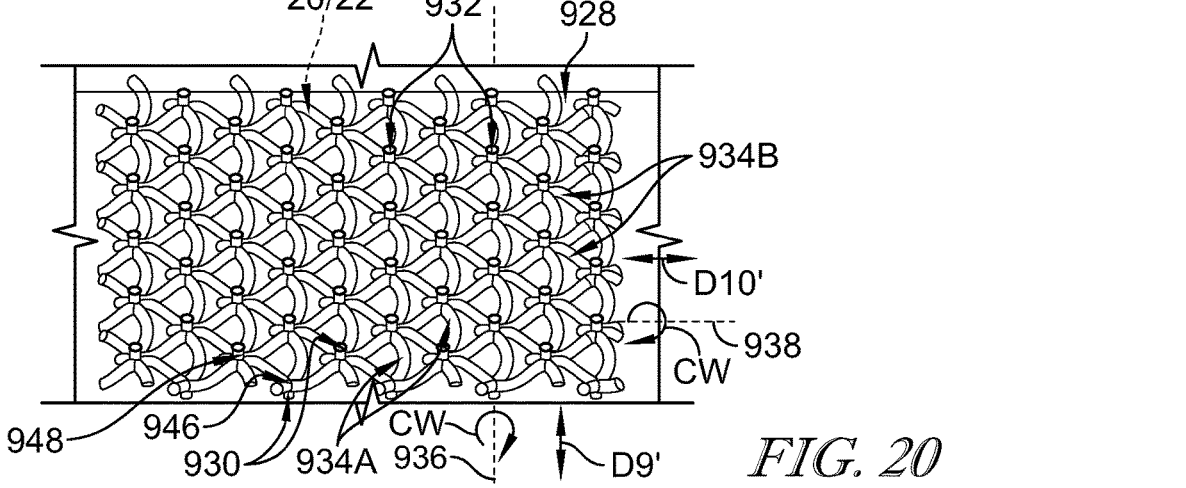
FIG. 20 is a top view of a tenth cooling air subsystem similar to the ninth cooling air subsystem of FIG. 18 that may be included in the cooling air distribution system.

Referring now to FIG. 20, an illustrative cooling air subsystem 928 may be included in the cooling air distribution system 26. The cooling air subsystem 928 includes feed ports 930 and discharge ports 932. The feed ports 930 are configured to receive cooling air from a source of cooling air. The discharge ports 932 are fluidly coupled to the feed ports 930 and configured to discharge cooling air provided to the feed ports 930. The discharge ports 932 are located exteriorly of the feed ports 930 such that the discharge ports 932 are closer to one of the pressure and suction side walls 20, 22 of the airfoil 16 than the feed ports 930.

The cooling air subsystem 928 also illustratively includes an array of cooling passages 934 interconnecting the feed ports 930 and the discharge ports 932 as shown in FIG. 20. The cooling passages 934 are configured to conduct cooling air exteriorly from the feed ports 930 to the discharge ports 932 so that at least some of the cooling air provided to the feed ports 930 is discharged by the discharge ports 932.

The array of cooling passages 934 illustratively includes one set of cooling passages 934A and another set of cooling passages 934B interwoven with the passages 934A as shown in FIG. 20. The cooling passages 934A are arranged to extend in a direction D9' and the cooling passages 934B are arranged to extend in a direction D10' perpendicular to the direction D9'. Each of the set of cooling passages 934A is embodied as, or otherwise includes, a passage having a generally corkscrew-type shape and a circular cross-sectional shape. Similarly, each of the set of cooling passages 934B is embodied as, or otherwise includes, a passage having a generally corkscrew-type shape and a circular cross-sectional shape.

Each of the illustrative cooling passages 934A extends around a longitudinal axis 936 in a clockwise direction CW as shown in FIG. 20. Each of the illustrative cooling passages 934B extends around a longitudinal axis 938 perpendicular to the longitudinal axis 936 in the clockwise direction CW.

The sets of cooling passages 934A, 934B illustratively intersect one another at intersection locations 946, 948 spaced apart from one another in the direction D9' as shown in FIG. 20. The intersection locations 946 are located interiorly of the intersection locations 948. The intersection locations 946 are fluidly coupled to the feed ports 930 and the feed ports 930 are configured to provide cooling air directly to the intersection locations 946. The intersection locations 948 are fluidly coupled to the discharge ports 932 and the discharge ports 932 are configured to discharge cooling air provided to the ports 930 directly from the intersection locations 948.

Figure 21:
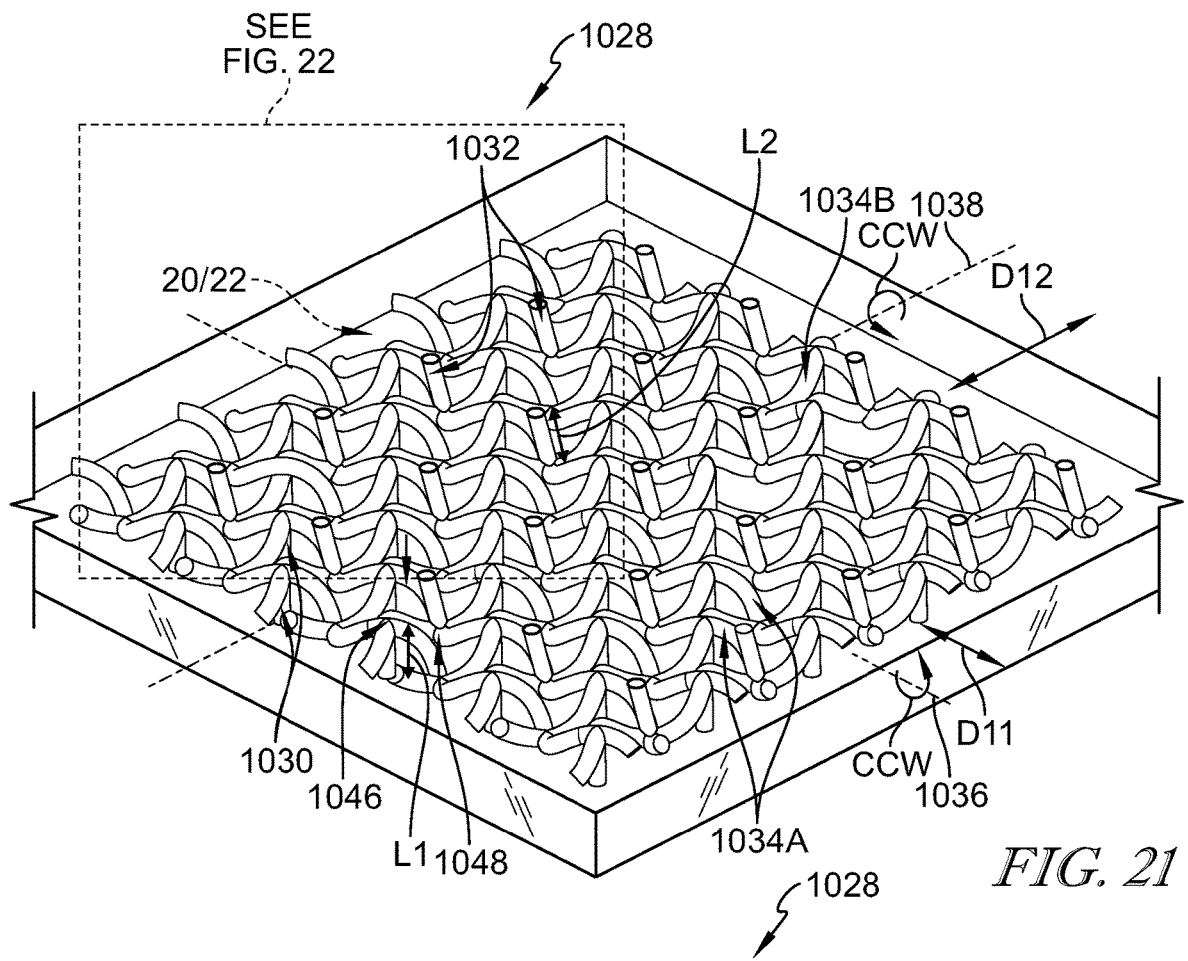
FIG. 21 is a perspective view of an eleventh cooling air subsystem similar to the ninth cooling air subsystem of FIG. 18 that may be included in the cooling air distribution system.
Figure 22:
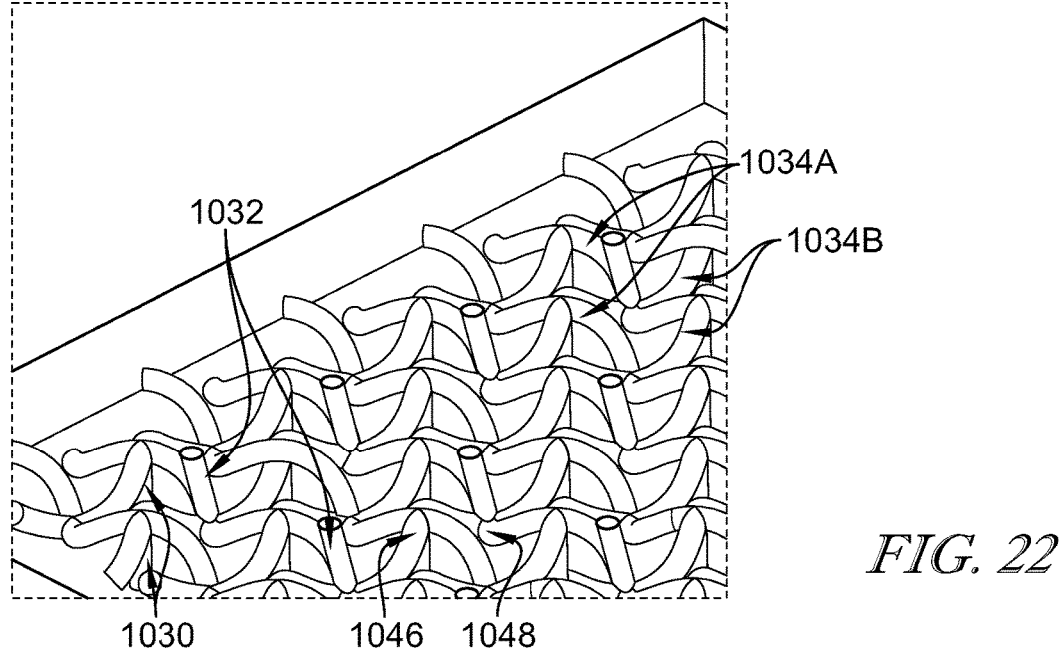
FIG. 22 is a detail view of a portion of the eleventh cooling air subsystem of FIG. 21 showing that one set of cooling passages having a generally corkscrew-type shape and a circular cross-sectional shape and another set of cooling passages having a generally corkscrew-type shape and a circular cross-sectional shape intersect one another at first intersection locations and at second intersection locations located exteriorly of the first intersection locations.

Referring now to FIGS. 21 and 22, an illustrative cooling air subsystem 1028 may be included in the cooling air distribution system 26. The cooling air subsystem 1028 includes feed ports 1030 and discharge ports 1032. The feed ports 1030 are configured to receive cooling air from a source of cooling air. The discharge ports 1032 are fluidly coupled to the feed ports 1030 and configured to discharge cooling air provided to the feed ports 1030. The discharge ports 1032 extend exteriorly of the feed ports 1030 such that the discharge ports 1032 are closer to one of the pressure and suction side walls 20, 22 of the airfoil 16 than the feed ports 1030.

In the illustrative embodiment, lengths L1 of each of the feed ports 1030 are greater than lengths of feed ports included in cooling air subsystems other than the subsystem 1028. For example, lengths L1 of the feed ports 1030 are greater than the lengths of the feed ports 830 included in the cooling air subsystem 828.

In the illustrative embodiment, lengths L2 of the discharge ports 1032 are greater than lengths of discharge ports included in cooling air subsystems other than the subsystem 1028. For example, lengths L2 of the discharge ports 1032 are greater than the lengths of the discharge ports 1032 included in the cooling air subsystem 828.

The cooling air subsystem 1028 also illustratively includes an array of cooling passages 1034 interconnecting the feed ports 1030 and the discharge ports 1032 as shown in FIGS. 21 and 22. The cooling passages 1034 are configured to conduct cooling air from the feed ports 1030 to the discharge ports 1032 so that at least some of the cooling air provided to the feed ports 1030 is discharged by the discharge ports 1032.

The array of cooling passages 1034 illustratively includes one set of cooling passages 1034A and another set of cooling passages 1034B interwoven with the passages 1034A as shown in FIGS. 21 and 22. The cooling passages 1034A are arranged to extend in a direction D11 and the cooling passages 1034B are arranged to extend in a direction D12 perpendicular to the direction D11. Each of the set of cooling passages 1034A is embodied as, or otherwise includes, a passage having a generally corkscrew-type shape and a circular cross-sectional shape. Similarly, each of the set of cooling passages 1034B is embodied as, or otherwise includes, a passage having a generally corkscrew-type shape and a circular cross-sectional shape.

Each of the illustrative cooling passages 1034A extends around a longitudinal axis 1036 in a counterclockwise direction CCW as shown in FIGS. 21 and 22. Each of the illustrative cooling passages 1034B extends around a longitudinal axis 1038 perpendicular to the longitudinal axis 1036 in the counterclockwise direction CCW.

The sets of cooling passages 1034A, 1034B illustratively intersect one another at intersection locations 1046, 1048 spaced apart from one another in the direction D11 as shown in FIGS. 21 and 22. The intersection locations 1046 are located exteriorly of the intersection locations 1048. The intersection locations 1046 are fluidly coupled to the feed ports 1030 and the feed ports 1030 are configured to provide cooling air directly to the intersection locations 1046. The intersection locations 1048 are fluidly coupled to the discharge ports 1032 and the discharge ports 1032 are configured to discharge cooling air provided to the ports 1030 directly from the intersection locations 1048.

Figure 23:
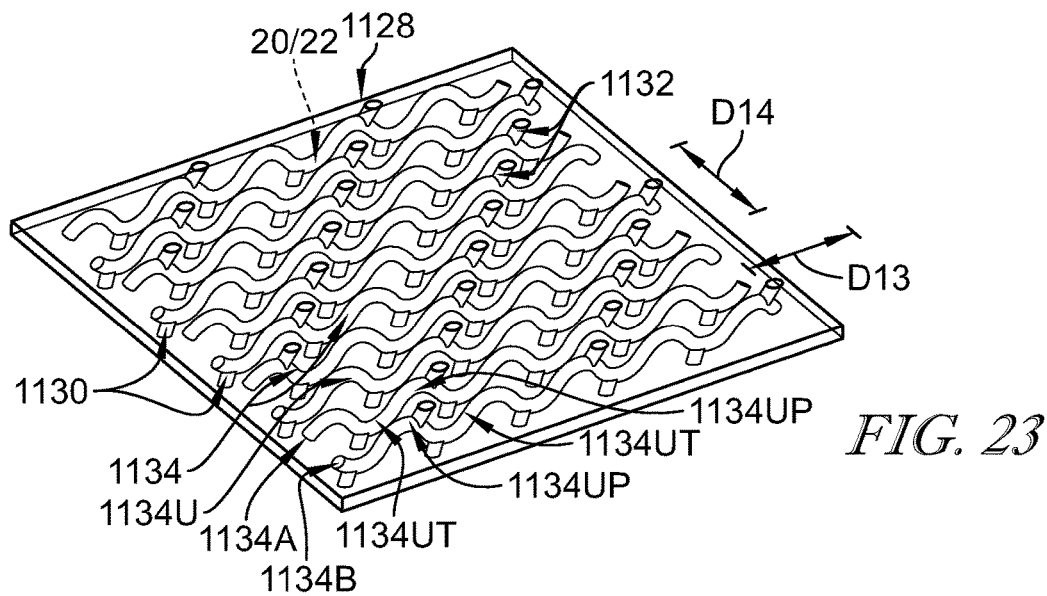
FIG. 23 is a perspective view of a twelfth cooling air subsystem that may be included in the cooling air distribution system shown in FIG. 1 showing that the twelfth cooling air subsystem includes one set of cooling passages having a generally sinusoidal shape and a circular cross-sectional shape.

Referring now to FIG. 23, an illustrative cooling air subsystem 1128 may be included in the cooling air distribution system 26. The cooling air subsystem 1128 includes feed ports 1130 and discharge ports 1132. The feed ports 1130 are configured to receive cooling air from a source of cooling air. The discharge ports 1132 are fluidly coupled to the feed ports 1130 and configured to discharge cooling air provided to the feed ports 1130. The discharge ports 1132 are located exteriorly of the feed ports 1130 such that the discharge ports 1132 are closer to one of the pressure and suction side walls 20, 22 than the feed ports 1130.

The cooling air subsystem 1128 also illustratively includes an array of cooling passages 1134 interconnecting the feed ports 1130 and the discharge ports 1132 as shown in FIG. 23. The cooling passages 1134 are configured to conduct cooling air exteriorly from the feed ports 1130 to the discharge ports 1132 so that at least some of the cooling air provided to the feed ports 1130 is discharged by the discharge ports 1132.

Each of the illustrative cooling passages 1134 is arranged to extend in a direction D13 as shown in FIG. 23. Each of the cooling passages 1134 is embodied as, or otherwise includes, a passage having a generally sinusoidal shape and a circular cross-sectional shape.

The illustrative cooling passages 1134 are spaced apart from one another in a direction D14 perpendicular to the direction D13 as shown in FIG. 23. Each of the cooling passages 1134 includes undulated portions 1134U having peaks 1134UP interconnected with troughs 1134UT. Adjacent cooling passages 1134 (e.g., cooling passages 1134A, 1134B) are arranged such that the troughs 1134UT of one passage (e.g., 1134A) and the peaks 1134UP of the adjacent passage (e.g., 1134B) are aligned with each other as the adjacent passages 1134 extend in the direction D13 as shown in FIGS. 23 and 24.

Figure 24:
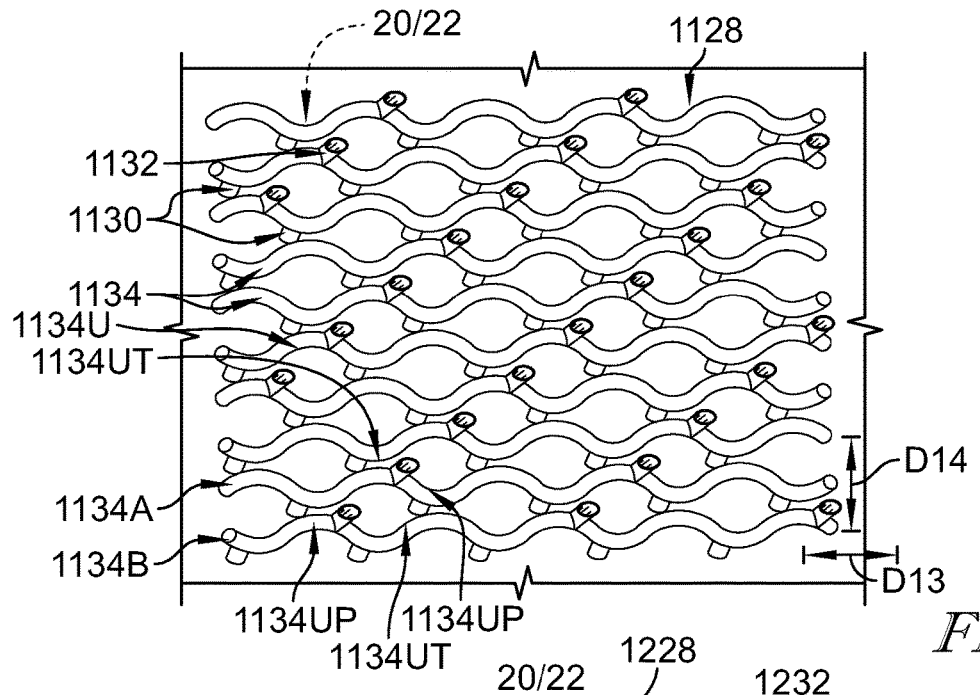
FIG. 24 is a top view of the twelfth cooling air subsystem of FIG. 23 showing that peaks of one cooling passage are aligned with, and located exteriorly of troughs, of another adjacent cooling passage as the adjacent cooling passages extend in a first direction.

Referring now to FIG. 24, the feed ports 1130 are arranged to provide cooling air directly to the troughs 1134UT of each of the cooling passages 1134. The discharge ports 1132 are arranged to discharge cooling air directly from at least some of the peaks 1134UP of each of the cooling passages 1134. In the illustrative embodiment, the discharge ports 1132 are arranged to discharge cooling air directly from at least one of every two adjacent peaks 1134UP of each cooling passage 1134.

Figure 25:
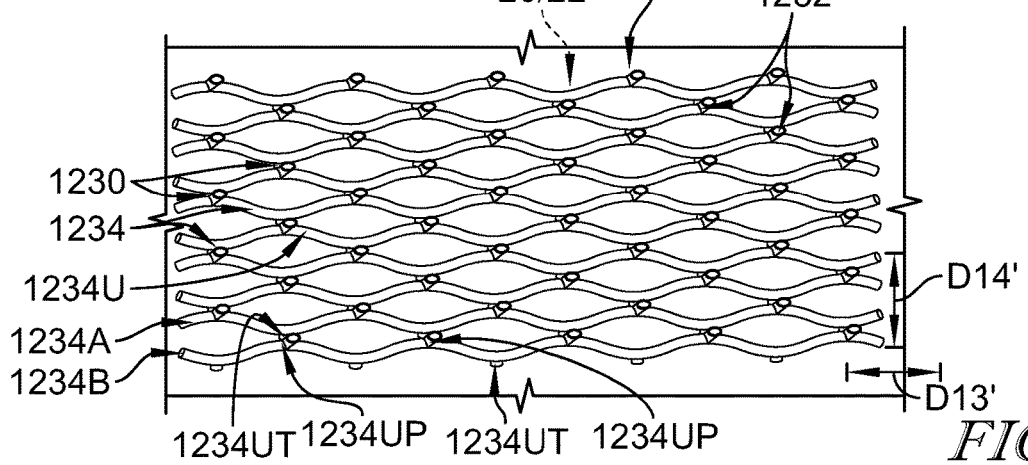
FIG. 25 is a top view of a thirteenth cooling air subsystem similar to the twelfth cooling air subsystem of FIG. 18 that may be included in the cooling air distribution system.

Referring now to FIG. 25, an illustrative cooling air subsystem 1228 may be included in the cooling air distribution system 26. The cooling air subsystem 1228 includes feed ports 1230 and discharge ports 1232. The feed ports 1230 are configured to receive cooling air from a source of cooling air. The discharge ports 1232 are fluidly coupled to the feed ports 1230 and configured to discharge cooling air provided to the feed ports 1230. The discharge ports 1232 are located exteriorly of the feed ports 1230 such that the discharge ports 1232 are closer to one of the pressure and suction side walls 20, 22 than the feed ports 1230.

The cooling air subsystem 1228 also illustratively includes an array of cooling passages 1234 interconnecting the feed ports 1230 and the discharge ports 1232 as shown in FIG. 25. The cooling passages 1234 are configured to conduct cooling air exteriorly from the feed ports 1230 to the discharge ports 1232 so that at least some of the cooling air provided to the feed ports 1230 is discharged by the discharge ports 1232.

Each of the illustrative cooling passages 1234 is arranged to extend in a direction D13' as shown in FIG. 25. Each of the cooling passages 1234 is embodied as, or otherwise includes, a passage having a generally sinusoidal shape and a circular cross-sectional shape.

The illustrative cooling passages 1234 are spaced apart from one another in a direction D14' perpendicular to the direction D13' as shown in FIG. 25. Each of the cooling passages 1234 includes undulated portions 1234U having peaks 1234UP interconnected with troughs 1234UT. Adjacent cooling passages 1234 (e.g., cooling passages 1234A, 1234B) are arranged such that the troughs 1234UT of one passage (e.g., 1234A) and the peaks 1234UP of the adjacent passage (e.g., 1234B) are aligned with each other as the adjacent passages 1234 extend in the direction D13' as shown in FIG. 25.

The feed ports 1230 are arranged to provide cooling air directly to the troughs 1234UT of each of the cooling passages 1234 as shown in FIG. 25. The discharge ports 1232 are arranged to discharge cooling air directly from at least some of the peaks 1234UP of each of the cooling passages 1234. In the illustrative embodiment, the discharge ports 1232 are arranged to discharge cooling air directly from every peak 1234UP of each cooling passage 1234.

Referring back to FIGS. 1 and 2, the illustrative cooling air distribution system 26 includes one or more cooling air subsystems that are arranged to extend along various portions of the airfoil 16 to provide different amounts of cooling. The one or more subsystems arranged to extend along various portions of the airfoil 16 are described in more detail below.

In the illustrative embodiment, at least one cooling air subsystem selected from the subsystems 228, 328, 1128, and 1128 is arranged to extend along the leading edge 24L of the airfoil 16 as suggested by FIG. 1. At least one cooling air subsystem selected from the subsystems 28, 128, 228, 328, 428, 528, 1128, and 1228 is arranged to extend along the trailing edge 24T of the airfoil 16. Because different subsystems may be selected for arrangement along the leading and trailing edges 24L, 24T, the different subsystems may be configured to provide different amounts of cooling along the edges 24L, 24T during operation of the airfoil 16.

In the illustrative embodiment, at least one cooling air subsystem selected from the subsystems 228, 1128, and 1128 is arranged to extend along the suction side wall 22 of the airfoil 16 as suggested by FIG. 1. At least one cooling air subsystem selected from the subsystems 28, 128, 428, 528, 628, 728, 828, 928, and 1028 is arranged to extend along the pressure side wall 20 of the airfoil 16 as suggested by FIG. 2. Because different subsystems may be selected for arrangement along the pressure and suction side walls 20, 22, the different subsystems may be configured to provide different amounts of cooling along the side walls 20, 22 during operation of the airfoil 16.

Referring now to FIGS. 26-32, a number of illustrative features may be included in the cooling passages of the cooling air subsystems 28, 128, 228, 328, 428, 528, 628, 728, 828, 928, 1028, 1128, and 1228. As discussed below, the features may include termination portions 1310, transition portions 1312, connecting portions 1314, straight portions 1316, and surface roughness steps 1326.

Figure 26:
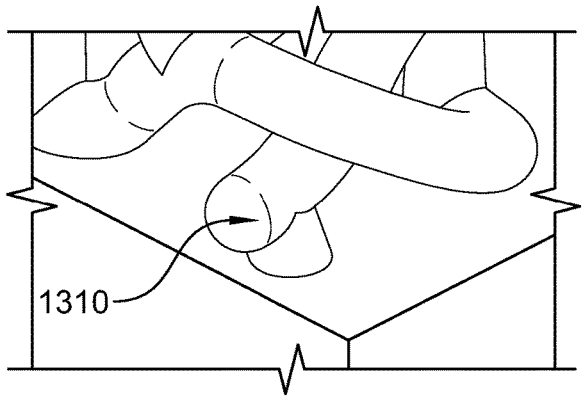
FIG. 26 is a magnified perspective view of a terminating portion of a cooling passage that may be included in one or more of the aforementioned cooling air subsystems.

Referring now to FIG. 26, in some embodiments, one or more cooling passages may include termination portions 1310. The termination portions 1310 may provide terminating points of the cooling passages such that the cooling passages stop abruptly at the termination portions 1310.

Figure 27:
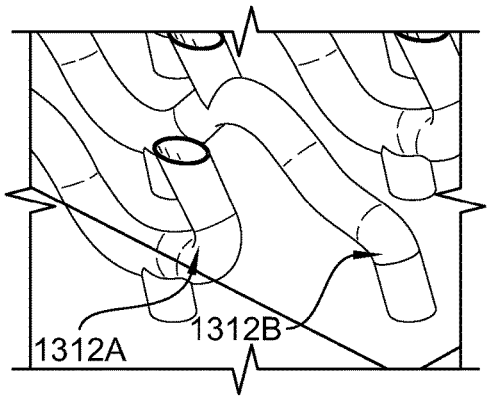
FIG. 27 is a magnified perspective view of transition sections of cooling passages that may be included in one or more of the aforementioned cooling air subsystems.

Referring now to FIG. 27, in some embodiments, one or more cooling passages may include transition portions 1312A and 1312B. The transition portions 1312A may provide smooth transitions from upstream portions of the cooling passages to discharge ports located downstream of the upstream portions. The transition portions 1312B may provide transitions from feed ports to portions of the cooling passages located downstream of the feed ports.

Figure 28:
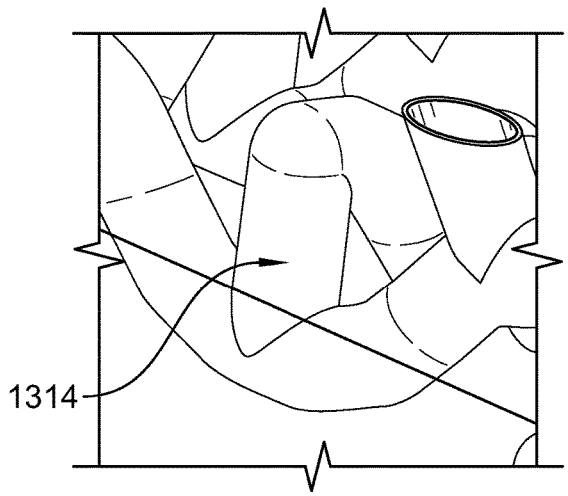
FIG. 28 is a magnified perspective view of a first connecting portion of a cooling passage that may be included in one or more of the aforementioned cooling air subsystems.

Referring now to FIG. 28, in some embodiments, one or more cooling passages may include connecting portions 1314A. The connecting portions 1314A may connect interwoven cooling passages such that the connecting portions 1314A at least partly define intersection locations between the interwoven cooling passages. The connecting portions 1314A may be embodied as, or otherwise include, cross-feed portions of the cooling passages.

Figure 29:
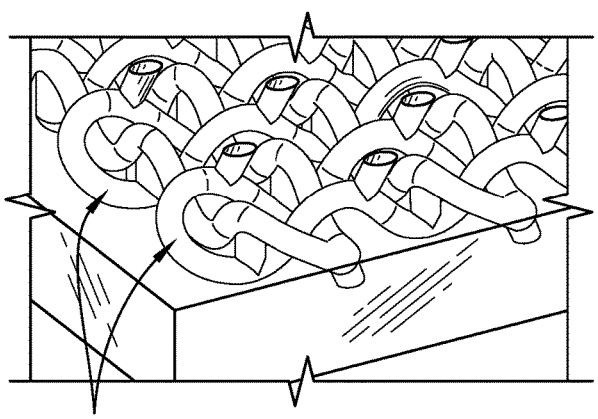
FIG. 29 is a magnified perspective view of a second connecting portion of a passage that may be included in one or more of the aforementioned cooling air subsystems.

Referring now to FIG. 29, in some embodiments, one or more cooling passages may include connecting portions 1314B. The connecting portions 1314B may connect adjacent cooling passages that are spaced apart from one another such that the adjacent cooling passages are fluidly coupled to one another.

Figure 30:
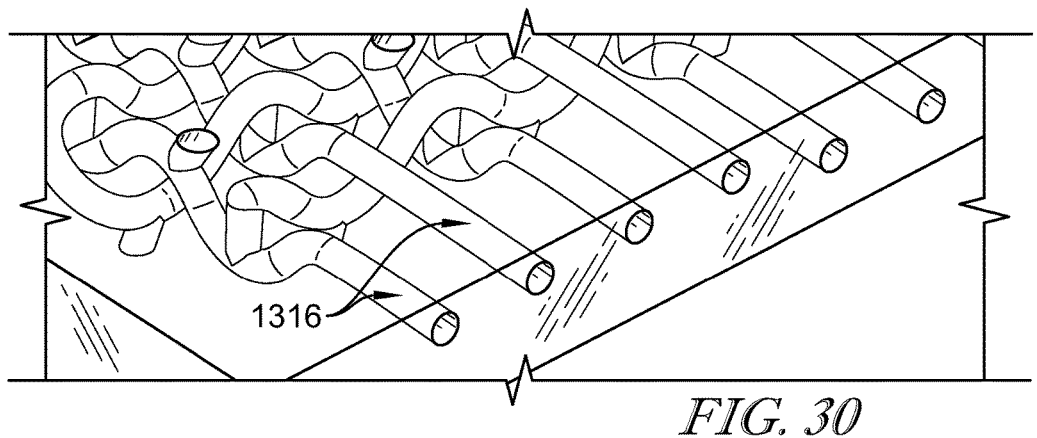
FIG. 30 is a magnified perspective view of straight portions of passages that may be included in one or more of the aforementioned cooling air subsystems.

Referring now to FIG. 30, in some embodiments, one or more cooling passages may include straight portions 1316. The straight portions 1316 may be configured to discharge cooling air provided to the cooling passages. As such, cooling air conducted by the cooling passages may be discharged from the straight portions 1316 in addition to, or in place of, being discharged from the discharge ports.

Figure 31:
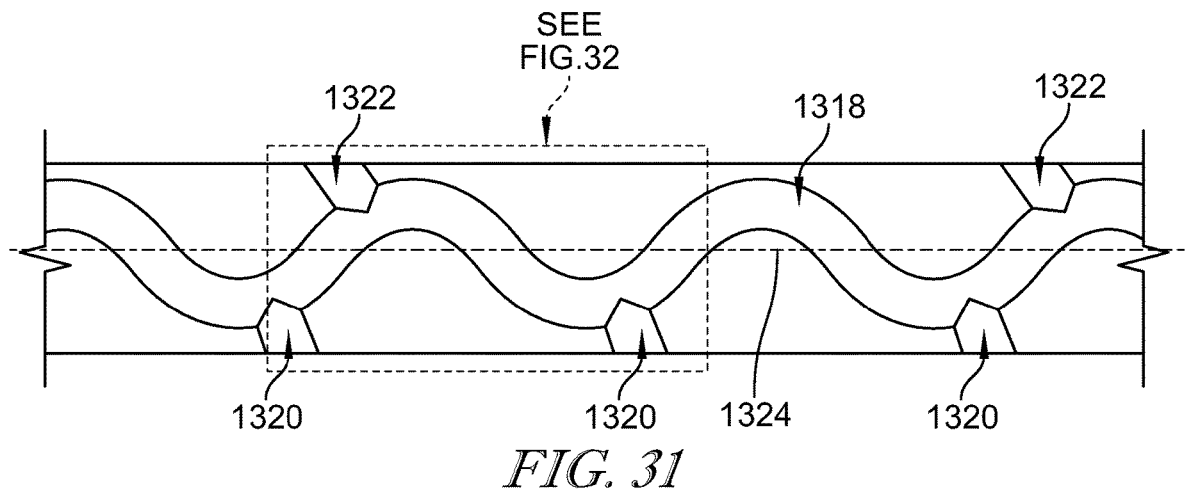
FIG. 31 is a diagrammatic view of a passage having a generally sinusoidal shape that extends interiorly and exteriorly of a central axis.

Referring now to FIG. 31, an illustrative cooling passage 1318 is fluidly coupled to feed ports 1320 and discharge ports 1322 located exteriorly of the feed ports 1320. The cooling passage 1318 extends exteriorly and interiorly of a central axis 1324 and has a generally sinusoidal shape. As such, the cooling passage 1318 may be embodied as, or otherwise include, (i) one or more of the cooling passages 34A, 34B included in the cooling air subsystem 28, (ii) one or more of the cooling passages 134A, 134B included in the cooling air subsystem 128, (iii) one or more of the cooling passages 434B included in the cooling air subsystem 428, (iv) one or more of the cooling passages 534A included in the cooling air subsystem 528, (v) one or more of the cooling passages 1134 included in the cooling air subsystem 1128, or (vi) one or more of the cooling passages 1234 included in the cooling air subsystem 1228.

In some embodiments, the feed ports 1320 and the discharge ports 1322 may extend at angles relative to one or more surfaces as shown in FIG. 31. For example, in some embodiments, the ports 1320 and the ports 1322 may extend at about angles of 45 degrees relative to the pressure and suction sides 20, 22 of the airfoil 16, or relative to one or more surfaces that at least in part define the cooling passage 1318. In other embodiments, the ports 1320 and the ports 1322 may extend relative to the pressure and suction sides 20, 22, or relative to one or more surfaces defining at least in part the passage 1318, at other suitable angles.

Figure 32:
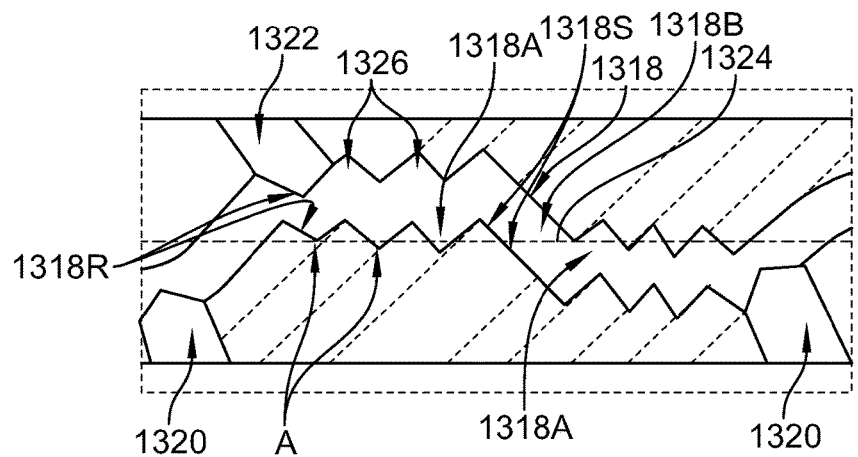
FIG. 32 is a detail view of the passage of FIG. 31 showing that the passage includes first portions having surface roughness steps formed at angles to the central axis and second portions that are not formed to include surface roughness steps.

Referring now to FIG. 32, the illustrative cooling passage 1318 includes portions 1318A and 1318B coupled to one another and spaced apart along the central axis 1324. The portions 1318A include surface roughness steps 1326 that are formed at angles A to the central axis 1324 to provide relatively rough surfaces 1318R of the cooling passage 1318. The portions 1318B do not include surface roughness steps and provide relatively smooth surfaces 1318S of the cooling passage 1318.

The illustrative surface roughness steps 1326 are embodied as, or otherwise include, features configured to redirect the flow of cooling air conducted through the cooling passage 1318 to increase the amount of heat transferred to the cooling air and facilitate cooling of the airfoil 16. In the illustrative embodiment, the surface roughness steps 1326 are formed by an Additive Layer Manufacturing (ALM) process. The steps 1326 may be embodied as, or otherwise include, bumps or steps formed as a consequence of imperfect layer resolution during the ALM process. The steps 1326 may be configured to trip and/or mix the flow of cooling air conducted through the passage 1318 to facilitate cooling of the airfoil 16.

Each of the illustrative surface roughness steps 1326 is formed at an angle A of about 45 degrees relative to the central axis 1324 as shown in FIG. 32. Formation of the surface roughness steps 1326 at the angle A relative to the central axis 1324 provides the relatively rough surfaces 1318R of the cooling passage 1318. During operation of the airfoil 16, the relatively rough surfaces 1318R are associated with a greater amount of heat transfer to the cooling air than the amount of heat transfer associated with the relatively smooth surfaces 1318S.

The present disclosure may employ micro-cooling passages (e.g., cooling passages 34, 134, 234, 334, 434, 534, 634, 734, 834, 934, 1034, 1134, 1234) below a surface (e.g., internal to the pressure and suction side walls 20, 22) to cool the surface and deliver flow to film rows. Cooling air from a cooling air source may enter the passages through impingement holes (e.g., feed ports 30, 130, 230, 330, 430, 530, 630, 730, 830, 930, 1030, 1130, 1230), flow through the passages, and then discharge through film holes (e.g., discharge ports 32, 132, 232, 332, 432, 532, 632, 732, 832, 932, 1032, 1132, 1232).

Alternating the direction of cooling air flow through the passages may optimize the internal heat transfer surface area such that a desirable amount of heat transfer to the cooling air is achieved. The region where heat transfer to the cooling air is the most effective may be just below the gas path surface (e.g., interiorly of the pressure and suction side walls 20, 22). To compensate for reduced heat transfer interiorly of that region, adjacent passages (e.g., adjacent passages 34A, 34B) may be arranged to approach the gas path surface. The adjacent passages may run parallel to one another or perpendicular to one another.

The impingement holes may be arranged such that they energize the flow in the cooling passages to minimize pressure drop while also promoting high heat transfer out of the airfoil (e.g., the airfoil 16). Cross-feed holes (e.g., the cross-feed portions 34C) may allow cooling air flow to be passed between adjacent passages to carry more heat in the cooling air before being discharged or to discharge flow in a more favorable location/orientation. The film holes may be aligned with the passages to discharge film air for cooling the gas path surface. The arrangement of the film holes may vary depending on the locations where the passages approach the gas path surface.

One cooling scheme (e.g., the cooling air subsystems 28, 128) may provide a two-directional mesh cooling pattern (e.g., the pattern 34). The scheme may include undulating passages (e.g., passages 34A, 34B) running in perpendicular directions (e.g., the directions D1, D2). The passages may be arranged to alternate high and low (e.g., the peaks 34UP of the passages 34A are positioned above/exteriorly of the troughs 34UT' of the passages 34B and the peaks 34UP' of the passages 34B are positioned above/exteriorly of the troughs 34UT of the passages 34A).

Cooling air may be fed to the passages by cooling holes (e.g., feed ports 30) and discharged from the passages by film holes (e.g., discharge ports 32). The passages may be connected via cross-feed holes (e.g., the cross-feed portions 34C). The film holes may be aligned with the passages (e.g., the passages 34B) or oriented relative to the passages to direct the discharge of cooling air flow. The spacing or frequency of the cooling holes, the passages, and/or the film holes may vary (e.g., variations between the cooling air subsystems 28, 128).

Another cooling scheme (e.g., the cooling air subsystem 228) may provide a helix-shaped cooling pattern. The scheme may include corkscrew passages (e.g., the corkscrew shaped passages 234A, 234B) running parallel to one another (e.g., in the direction D3). The passages may be interlocked/connected (e.g., by the cross-feed portions 234CF). The passages may rotate in the same direction (e.g., around the axis 236 in the CCW direction).

Cooling air may be fed to the passages by cooling holes (e.g., feed ports 230) and discharged from the passages by film holes (e.g., discharge ports 232). The passages may be connected via cross-feed holes (e.g., the cross-feed portions 234CF) or kept isolated from one another. Cooling air may be conducted by the passages in the same direction (e.g., in the direction indicated by arrow 242 from the portion 238 to the portion 240) or in opposite directions (e.g., in the directions indicated by arrows 242, 244).

Another cooling scheme (e.g., the cooling air subsystem 328) may provide another helix-shaped cooling pattern. The scheme may include corkscrew passages (e.g., the corkscrew shaped passages 334A, 334B) running parallel to one another (e.g., in the direction D4). The passages may intersect one another (e.g., at the intersection locations 346C, 348C, 346D, 348D). The passages may rotate in opposite directions (e.g., the passages 334A, 334B rotate around the axis 336 in the CCW and CW directions, respectively). Helixes defined by the passages may be arranged to alternate high and low (e.g., the intersection locations 346C of one helix shape 334H1 are positioned below/interiorly of the intersection locations 348D of another helix shape 334H2 and the intersection locations 348C of the shape 334H1 are positioned above/exteriorly of the intersection locations 346D of the shape 334H2).

Cooling air may be fed to the passages by cooling holes (e.g., feed ports 330) and discharged from the passages by film holes (e.g., discharge ports 332). Cooling air may be discharged from the film holes at the helix intersections (e.g., the intersection locations 348C, 348D).

Another cooling scheme (e.g., the cooling air subsystems 428, 528) may include a corkscrew passage (e.g., the passages 434A, 534B) and an undulating passage (e.g., the passages 434B, 534A) running in perpendicular directions (e.g., the directions D5/D6 and D5'/D6').

Cooling air may be fed to the passages by cooling holes (e.g., feed ports 430, 530) and discharged from the passages by film holes (e.g., discharge ports 432, 532). The passages may be connected via cross-feed holes (e.g., the cross-feed portions 434CF, 534CF).

Another cooling scheme (e.g., the cooling air subsystems 628, 728) may include corkscrew passages (e.g., the passages 634A, 634B and the passages 734A, 734B) running in perpendicular directions (e.g., the directions D7/D8 and D7'/D8'). The passages may rotate in opposite directions (e.g., the passages 634A rotate around the axis 636 in the CCW direction and the passages 634B rotate around the axis 638 in the CW direction).

Cooling air may be fed to the passages by cooling holes (e.g., feed ports 630, 730) and discharged from the passages by film holes (e.g., discharge ports 632, 732). The passages may be connected via cross-feed holes (e.g., the cross-feed portions 634CF, 734CF).

Another cooling scheme (e.g., the cooling air subsystems 828, 928) may include corkscrew passages (e.g., the passages 834A, 834B and the passages 934A, 934B) running in perpendicular directions (e.g., the directions D9/D10 and D9'/D10'). The passages may intersect one another at high or low points (e.g., at the intersection locations 846, 848 and 946, 948). The passages may rotate in the same direction (e.g., the passages 834A, 834B rotate about the respective axes 836, 838 in the CCW direction and the passages 934A, 936A rotate about the respective axes 936, 938 in the CW direction).

Cooling air may be fed to the passages by cooling holes (e.g., feed ports 830, 930) and discharged from the passages by film holes (e.g., discharge ports 832, 932). Cooling air may be discharged from the film holes at the helix intersections (e.g., at the intersection locations 848, 948).

Another cooling scheme (e.g., the cooling air subsystem 1028) may include corkscrew passages (e.g., the passages 1034A, 1034B) running in perpendicular directions (e.g., the directions D11/D12). Cooling air may be fed to the passages by cooling holes (e.g., feed holes 1030) and discharged from the passages by film holes (discharge ports 1032). The cooling and film hole positions may be switched compared to the cooling and film hole positions of the previously described cooling scheme (e.g., the subsystems 828, 928). Additionally, the lengths of the film holes and cooling holes (e.g., respective lengths L1 and L2) may be greater than the lengths of the film holes and cooling holes of the previously described cooling scheme.

Another cooling scheme (e.g., the cooling air subsystems 1128, 1228) may provide a one-directional mesh cooling pattern. The scheme may include undulating passages (e.g., 1134 and 1234) running parallel to one another (e.g., in the directions D13 and D13'). The passages may be arranged to alternate high and low (e.g., the peaks 1134UP of the passage 1134A are positioned above/exteriorly of the troughs 1134UT of the passage 11348 and the peaks 1134UP of the passage 11348 are positioned above/exteriorly of the troughs 1134UT of the passage 1134A).

Cooling air may be fed to the passages by cooling holes (e.g., feed ports 1130, 1230) and discharged from the passages by film holes (e.g., discharge ports 1132, 1232). The spacing or frequency of the cooling holes, the passages, and/or the film holes may vary (e.g., variations between the cooling air subsystems 1128, 1228).

The cooling passages may include one of the following features: an abrupt stop (e.g., the termination portion 1310), a transition to outlet (e.g., the transition portion 1312A), a transition to inlet (e.g., the transition portion 1312B), a connection to an adjacent passage (e.g., the connecting portions 1314A, 1314B), or a discharge to straight channel (e.g., the straight portions 1316). In some embodiments, one cooling scheme may transition into another scheme. For example, cooling schemes 228, 328 may transition into cooling scheme 1128 or 1228.

In some embodiments, additive layer manufacturing (ALM) may be used to form the passages and create features beneficial to heat transfer. ALM may be sensitive to feature size and build direction. In some embodiments, heat transfer features (e.g., the surface roughness steps 1326) may be formed by ALM when the surface geometry is about 45 degrees to the build direction.

Along the suction side (e.g., the suction side wall 20) of the airfoil, performance losses may be experienced based on film hole placement. It may be desirable to manage heat transferred to the cooling air over long distances. Cooling scheme 228 may provide a desirable heat transfer surface area and pressure drop along the suction side. Cooling schemes 1128, 1228 may provide desirable spacing to achieve a specific cooling amount along the suction side.

Along the pressure side (e.g., the pressure side wall 20) of the airfoil, high heat loads may require high cooling. Cooling schemes 28, 128, 428, 528, 628, 728, 828, 928, and 1028 may provide a desirable a heat transfer surface area and cooling flow along the pressure side. The corkscrew passages included in the cooling schemes may experience less pressure drop than the undulating passages included in those cooling schemes. The undulating passages included in those cooling schemes may permit more cooling air mixing to be achieved than the corkscrew passages included in those schemes. The cooling schemes may be oriented along the pressure side radially, chordwise, or anywhere in between. The orientation of the cooling schemes may affect the angles of the film holes.

Along the leading edge (e.g., the leading edge 24L) of the airfoil, cooling schemes 228, 328, 1128, 1228 may extend radially to reduce gas pressure variation near the stagnation point. Film spacing associated with the scheme 228 may be tighter than film spacing associated with the scheme 328. Film spacing may be varied to a greater degree in the schemes 1128, 1128 compared to such spacing in the schemes 228, 328 to provide more variable inlet gas profiles.

Along the trailing edge (e.g., the trailing edge 24T) of the airfoil, it may be desirable to manage heat transferred to the cooling air upstream to optimize heat transfer at the trailing edge. The trailing edge may have the farthest distance from the main cooling passage. Cooling schemes 228, 328, 1128, and 1228 may extend along the trailing edge to deliver cooling air from a core of the airfoil to the trailing edge in a desirable manner. Cooling schemes 28, 128, 428, 528 may extend along the trailing edge to deliver a desirable amount of cooling. Passages arranged along the trailing edge may transition to straight sections (e.g., the straight sections 1316) to eject cooling air from the trailing edge.

The aforementioned cooling schemes may be applied to combustor liners that tend to be flat with varying levels of heat load. The liners may require high cooling levels spaced evenly across the surfaces. Cooling schemes 28, 128, 428, 528, 628, 728, 828, 928, and 1028 may provide a desirable a heat transfer surface area and deliver adequate amounts of cooling flow for combustor liners.

The aforementioned cooling schemes may be applied to turbine shrouds that tend to be flat with varying levels of heat load. The shrouds may include abradable coatings that prevent film cooling. Cooling schemes 228, 328, 1128, 1228 may be used to deliver cooling air axially or circumferentially along the turbine shroud and to smooth out cooling air heating to achieve even cooling.

In other embodiments, the aforementioned cooling schemes may be applied to other geometries. The cooling schemes may be applied to any geometry having sufficient thickness and access to a cooling reservoir.

The present disclosure may provide a wide range of cooling schemes. The cooling schemes depicted in the drawings may be based on estimated thickness requirements and minimum airfoil curvature requirements. Products employing the cooling schemes disclosed herein may use elements from one or more schemes based on manufacturability, consistency, and cooling performance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil comprising
a pressure side wall,
a suction side wall arranged opposite the pressure side wall, and
a cooling air distribution system formed internal to at least one of the pressure side wall and the suction side wall, the cooling air distribution system configured to distribute cooling air through the airfoil to cool the airfoil, the cooling air distribution system including
a plurality of feed ports configured to receive cooling air from a source of cooling air,
a plurality of discharge ports fluidly coupled to the plurality of feed ports and configured to discharge cooling air provided to the plurality of feed ports, the plurality of discharge ports located exteriorly of the plurality of feed ports so that the plurality of discharge ports are closer to an exterior of the at least one of the pressure side wall and the suction side wall than the plurality of feed ports, and
a plurality of cooling passages interconnecting the plurality of feed ports and the plurality of discharge ports, the plurality of cooling passages configured to conduct cooling air from the plurality of feed ports to the plurality of discharge ports so that at least some of the cooling air provided to the plurality of feed ports is discharged by the plurality of discharge ports, the plurality of cooling passages including a first set of passages having a circular cross-section and a second set of passages having a circular cross-section interwoven with the first set of passages such that the second set of passages at least partially wrap around the first set of passages and the second set of passages being arranged to extend perpendicular to the first set of passages, the first set of passages each having a sinusoidal shape or a corkscrew-type shape and the second set of passages each having a sinusoidal shape or a corkscrew-type shape, and the first and second sets of passages being fluidly connected to one another by cross-feed portions such that cooling air provided to each of the first set of passages may be conducted through one of the second set of passages,
wherein the first set of passages is arranged to extend in a first direction, the second set of passages is arranged to extend in a second direction perpendicular to the first direction, the plurality of feed ports extend interiorly in the third direction from the first set of passages, the plurality of discharge ports extend exteriorly in the third direction from the second set of passages, and the cooling air is configured to be discharged by one of the plurality of discharge ports toward the exterior of the at least one of the pressure side wall and the suction side walls during operation of the airfoil.

2. The airfoil of claim 1, wherein each of the first set of passages has a sinusoidal shape and includes a plurality of peaks interconnected with a plurality of troughs and each of the second set of passages has a sinusoidal shape and includes a plurality of peaks interconnected with a plurality of troughs.

3. The airfoil of claim 2, wherein the plurality of feed ports are arranged to provide cooling air directly to the troughs of each of the first set of passages and the plurality of discharge ports are arranged to discharge cooling air directly from the peaks of each of the second set of passages.

4. The airfoil of claim 1, wherein each of the first set of passages has a corkscrew-type shape and each of the second set of passages has a sinusoidal shape and includes a plurality of peaks interconnected with a plurality of troughs.

5. The airfoil of claim 1, wherein each of the first set of passages has a corkscrew-type shape and each of the second set of passages has a corkscrew-type shape.

6. The airfoil of claim 5, wherein each of the first set of passages extends around a first longitudinal axis in one direction and each of the second set of passages extends around a second longitudinal axis perpendicular to the first longitudinal axis in the one direction.

7. An airfoil comprising
a pressure side wall,
a suction side wall arranged opposite the pressure side wall, and
a cooling air distribution system formed internal to at least one of the pressure side wall and the suction side wall, the cooling air distribution system configured to distribute cooling air through the airfoil to cool the airfoil, the cooling air distribution system including, a first set of cooling passages each having one of a sinusoidal shape or a corkscrew-type shape and a second set of cooling passages each having a sinusoidal shape or a corkscrew-type shape, the first and second sets of cooling passages intersecting one another such that cooling air provided to each of the first set of cooling passages may be conducted through one of the second set of cooling passages before being discharged toward one of the pressure side wall and the suction side wall during operation of the airfoil,
wherein the second set of cooling passages are interwoven with the first set of cooling passages such that the second set of cooling passages at least partially wrap around the first set of cooling passages,
wherein the cooling air distribution system further includes a plurality of feed ports and a plurality of discharge ports fluidly connected to the first set of cooling passages and the second set of cooling passages and configured to direct cooling air into and out of the first set of cooling passages and the second set of cooling passages, the plurality of discharge ports located exteriorly of the plurality of feed ports so that the plurality of discharge ports are closer to an exterior of the at least one of the pressure side wall and the suction side wall than the plurality of feed ports, and the cooling air is configured to be discharged by the plurality of discharge ports toward the exterior of the at least one of the pressure side wall and the suction side walls during operation of the airfoil.

8. The airfoil of claim 7, wherein the first and second sets of cooling passages are arranged to extend perpendicular to one another, the first set of cooling passages each have a sinusoidal shape and include a plurality of peaks interconnected with a plurality of troughs and a plurality of cross-feed portions interconnected with and extending interiorly away from the plurality of peaks, the second set of cooling passages each have a sinusoidal shape and include a plurality of peaks interconnected with a plurality of troughs, and the plurality of cross-feed portions of the first set of cooling passages intersect the troughs of the second set of cooling passages.

9. The airfoil of claim 7, wherein the first set of cooling passages each have a corkscrew-type shape, the second set of passages each have a corkscrew-type shape and each cooperate with one of the first set of cooling passages to define a helix shape, each one of the first set of cooling passages extends around a longitudinal axis in a first direction, and one of the second set of cooling passages extends around the longitudinal axis in the first direction.

10. The airfoil of claim 7, wherein the first set of cooling passages each have a corkscrew-type shape, the second set of passages each have a corkscrew-type shape and each cooperate with one of the first set of cooling passages to define a helix shape, each one of the first set of cooling passages extends around a longitudinal axis in a first direction, and one of the second set of cooling passages extends around the longitudinal axis in a second direction opposite the first direction.

11. The airfoil of claim 10, wherein the first and second sets of cooling passages intersect one another at first intersection locations and second intersection locations spaced apart from one another, the first intersection locations are located interiorly of the second intersection locations, the first intersection locations are fluidly coupled to the plurality of feed ports configured to provide cooling air directly to the first intersection locations, and the second intersection locations are fluidly coupled to the plurality of discharge ports configured to discharge cooling air provided by the plurality of feed ports directly from the second intersection locations.

12. The airfoil of claim 7, wherein the first and second sets of cooling passages are arranged to extend perpendicular to one another, the first set of cooling passages each have a corkscrew-type shape and include a plurality of cross-feed portions interconnected with and extending interiorly away from at least one coil portion of each of the first set of cooling passages, the second set of cooling passages each have a sinusoidal shape and include a plurality of peaks interconnected with a plurality of troughs, and the plurality of cross-feed portions of the first set of cooling passages intersect the troughs of the second set of cooling passages.

13. The airfoil of claim 7, wherein the first and second sets of cooling passages are arranged to extend perpendicular to one another, the first set of cooling passages each have a corkscrew-type shape, the second set of passages each have a corkscrew-type shape, each one of the first set of cooling passages extends around a first longitudinal axis in a first direction, and each one of the second set of cooling passages extends around a second longitudinal axis perpendicular to the first longitudinal axis in a second direction opposite the first direction.

14. The airfoil of claim 7, wherein the first and second sets of cooling passages are arranged to extend perpendicular to one another, the first set of cooling passages each have a corkscrew-type shape, the second set of passages each have a corkscrew-type shape, each one of the first set of cooling passages extends around a first longitudinal axis in a first direction, and each one of the second set of cooling passages extends around a second longitudinal axis perpendicular to the first longitudinal axis in the first direction.

15. An airfoil comprising
a pressure side wall,
a suction side wall arranged opposite the pressure side wall, and
a cooling air distribution system formed internal to at least one of the pressure side wall and the suction side wall, the cooling air distribution system configured to distribute cooling air through the airfoil to cool the airfoil, the cooling air distribution system including
a plurality of feed ports configured to receive cooling air from a source of cooling air, a plurality of discharge ports fluidly coupled to the plurality of feed ports and configured to discharge cooling air provided to the plurality of feed ports, the plurality of discharge ports located exteriorly of the plurality of feed ports, and at least one array of cooling passages interconnecting the plurality of feed ports and the plurality of discharge ports, at least one of the cooling passages extending exteriorly and interiorly of a central axis, the at least one of the cooling passages including first portions spaced apart axially from one another along the central axis having surface roughness steps formed at angles to the central axis to provide rough surfaces of the at least one of the cooling passages and second portions that extend between and interconnect the first portions and that do not include surface roughness steps to provide smooth surfaces of the at least one of the cooling passages.

16. The airfoil of claim 15, wherein each of the surface roughness steps is formed at an angle of 45 degrees relative to the central axis.

17. The airfoil of claim 16, wherein the at least one array of cooling passages includes a first array of cooling passages arranged to extend along the pressure side wall and a second array of cooling passages arranged to extend along the suction side wall and the first and second arrays of cooling passages are different from one another and configured to provide different amounts of cooling along the pressure and suction side walls of the airfoil during operation of the airfoil.

18. The airfoil of claim 17, wherein the pressure side wall and the suction side wall cooperate to define a leading edge of the airfoil and a trailing edge of the airfoil arranged opposite the leading edge, the at least one array of cooling passages includes a third array of cooling passages arranged to extend along the leading edge of the airfoil and a fourth array of cooling passages arranged to extend along the trailing edge of the airfoil, and the third and fourth arrays of cooling passages are different from one another and configured to provide different amounts of cooling along the leading and trailing edges of the airfoil during operation of the airfoil.

19. The airfoil of claim 1, wherein at least one of the cooling passages extending exteriorly and interiorly of a central axis, the at least one of the plurality of cooling passages including first portions spaced apart axially from one another relative to the central axis and having surface roughness steps formed at angles to the central axis to provide rough surfaces of the at least one of the plurality of cooling passages and second portions that extend between and interconnect the first portions and that do not include surface roughness steps to provide smooth surfaces of the at least one of the plurality of cooling passages.

20. The airfoil of claim 7, wherein at least one of the cooling passages extending exteriorly and interiorly of a central axis, the at least one of the plurality of cooling passages including first portions spaced apart axially from one another relative to the central axis and having surface roughness steps formed at angles to the central axis to provide rough surfaces of the at least one of the plurality of cooling passages and second portions that extend between and interconnect the first portions and that do not include surface roughness steps to provide smooth surfaces of the at least one of the plurality of cooling passages.

* * * * *